(12) United States Patent
Zhang et al.

(10) Patent No.: US 9,219,344 B2
(45) Date of Patent: Dec. 22, 2015

(54) GENERATING ULTRASHORT LASER PULSES BASED ON TWO-STAGE PULSE PROCESSING

(71) Applicant: Calmar Optcom, Inc., Sunnyvale, CA (US)

(72) Inventors: Rui Zhang, Palo Alto, CA (US); Hong Cong, Sunnyvale, CA (US); Sha Tong, Mountain View, CA (US); Jerry Prawiharjo, San Jose, CA (US); En-Kuang Tien, Sunnyvale, CA (US); Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 48 days.

(21) Appl. No.: 13/735,947

(22) Filed: Jan. 7, 2013

(65) Prior Publication Data
US 2013/0250982 A1 Sep. 26, 2013

Related U.S. Application Data

(60) Provisional application No. 61/631,588, filed on Jan. 6, 2012.

(51) Int. Cl.
*H01S 3/10* (2006.01)
*G02F 1/35* (2006.01)
*H01S 3/23* (2006.01)
*H01S 3/00* (2006.01)

(52) U.S. Cl.
CPC ............... *H01S 3/10* (2013.01); *G02F 1/3513* (2013.01); *H01S 3/0057* (2013.01); *H01S 3/0092* (2013.01); *H01S 3/2316* (2013.01)

(58) Field of Classification Search
CPC .................................................... H01S 3/0057
See application file for complete search history.

(56) References Cited

U.S. PATENT DOCUMENTS

| | | | | |
|---|---|---|---|---|
| 4,588,957 A | * | 5/1986 | Balant et al. | 359/337.5 |
| 4,655,547 A | * | 4/1987 | Heritage et al. | 359/563 |
| 4,819,033 A | * | 4/1989 | Yoshitake et al. | 355/53 |
| 5,956,173 A | * | 9/1999 | Svelto et al. | 359/332 |
| 2010/0046067 A1 | | 2/2010 | Fermann et al. | |
| 2010/0091359 A1 | * | 4/2010 | Yamamoto et al. | 359/347 |
| 2010/0149641 A1 | * | 6/2010 | Greenberg et al. | 359/566 |
| 2011/0002691 A1 | * | 1/2011 | Lin | 398/118 |

FOREIGN PATENT DOCUMENTS

JP         06088976 A  *  3/1994  ............... G02F 1/35

OTHER PUBLICATIONS

Tomlinson et al., "Compression of Optical Pulses Chirped by Self-Phase Modulcation in Fibers," Apr. 1984, J. Opt. Soc. Am. B, vol. 1, No. 2, 139-149.*

Kim, Tae Hoon, International Search Report, PCT Application No. PCT/US2013/020583, Jun. 26, 2013, 10 pages.

(Continued)

*Primary Examiner* — Joshua King
(74) *Attorney, Agent, or Firm* — Perkins Coie LLP

(57) ABSTRACT

Techniques and devices for producing short laser pulses, including generating ultrashort laser pulses by separating a nonlinear processing of laser pulses via nonlinear self-phase modulation (SPM) in a nonlinear optical medium from a subsequent linear processing of the laser pulses to achieve ultrashort laser pulses.

3 Claims, 31 Drawing Sheets

(56) References Cited

OTHER PUBLICATIONS

Bècamel, Philippe, International Preliminary Report on Patentability, PCT Application No. PCT/US2013/020583, Jul. 17, 2014, 7 pages.
Ouzounov, Dimitre G. et al., "Soliton pulse compression in photonic band-gap fibers", Optics Expiress, vol. 13, No. 16, Aug. 8, 2005, pp. 6153-6159.
Mollenauer, L.F. et al., "Extreme picosecond pulse narrowing by means of soliton effect in single-mode optical fibers", Optics Lettrs, vol. 8, No. 5, May 1983, pp. 289-291.
Arbore, M. A. et al., "Engineerable compression of ultrashort pulses by use of second-harmonic generation in chirped-period-poled lithium niobate", Optics Letters, vol. 22, No. 17, Sep. 1, 1997, pp. 1341-1343.
Chang, Guoqing et al., "32 W Femtosecond Yb-Fiber CPA System based on Chirped-Volume-Bragg-Gratings", OSA / CLEO/QELS 2008, 2 pages.
Agrawal, G.P., Nonlinear Fiber Optics, 3rd ed. (Academic, 2001), pp. 136-137.
G. P. Agrawal, Nonlinear Fiber Optics, 3rd ed. (Academic, 2001), pp. 134-135.

\* cited by examiner

GENERATING ULTRASHORT LASER PULSES BASED ON TWO-STAGE PULSE PROCESSING

PRIORITY CLAIM AND RELATED PATENT APPLICATION

This patent document claims the priority of U.S. Provisional Application No. 61/631,588 entitled "Compact high-peak power femtosecond fiber laser" filed on Jan. 6, 2012 by inventors Rui Zhang, Hong Cong, Sha Tong, Jerry Prawiharjo, En-Kuang Tien and Anthony Hong Lin. The entire disclosure of the above application is incorporated by reference as part of this document.

BACKGROUND

This patent document relates to generation and control of laser pulses, including optical pulse amplifiers and pulse lasers.

Ultra short pulsed (USP) lasers with a pulse length less than 10 picoseconds and a relatively high energy level of above 10 nJ per pulse can be useful for a wide range of applications such as material processing, optical sensing, optical ablation, precision surgery including ophthalmology, biomedical, non-linear studies and spectroscopy. High energy laser pulses can be generated by amplifying laser pulses generated by a seed laser. Various optical amplifiers are designed to amplify light by providing an optical gain at the same wavelength of the light to be amplified so that the light, after transmitting through an optical gain medium of the optical amplifier, is amplified in its power or energy and the amplified light is at the same wavelength of the original light prior to the amplification. The optical gain of the optical amplifier can be obtained by pump light that optically excites the optical gain medium such as a Er doped fiber amplifier, or by an electrically energized gain medium such as a semiconductor optical amplifier based on quantum wells and other gain mechanisms.

SUMMARY

This document describes techniques and devices for producing short laser pulses based on chirped pulse amplification.

In one aspect, a method is provided for generating ultrashort laser pulses by separating a nonlinear processing of laser pulses via nonlinear self-phase modulation (SPM) in a nonlinear optical medium from a subsequent linear processing of the laser pulses to achieve ultrashort laser pulses. This method includes directing input laser pulses into a nonlinear optical processing module to have an optical intensity that reaches at or above an intensity threshold for SPM in the nonlinear optical processing module to cause spectral broadening of, and an amount of frequency chirp in, each of the laser pulses due to the nonlinear SPM; controlling an intensity of spectrally broadened laser pulses output from the nonlinear optical processing module to be below a nonlinear intensity threshold level for nonlinear SPM in a linear optical processing module with anomalous dispersion that is optically coupled to receive the spectrally broadened laser pulses output from the nonlinear optical processing module without causing optical nonlinearity or the nonlinear SPM; and configuring a length of optical propagation of the linear optical processing module to cause an amount of anomalous optical dispersion in the spectrally broadened laser pulses that compensates for the frequency chirp produced by the nonlinear optical processing module and causes compression of a pulse width in time to produce output laser pulses that are spectrally broadened and are compressed in the pulse duration in time with respect to a spectral width and a pulse duration of the input laser pulses.

In another aspect, a device for generating ultrashort laser pulses is provided to include an initial pulse generator that produces initial input laser pulses with a desired total optical energy per pulse and an initial pulse duration; a nonlinear optical processing module coupled to receive the initial laser pulses to cause nonlinear self-phase modulation (SPM) on each laser pulse to create spectral broadening of, and an amount of frequency chirp in, each of the laser pulses due to the nonlinear SPM; a linear optical processing module with anomalous dispersion that is optically coupled to receive the spectrally broadened laser pulses from the nonlinear optical processing module at an optical intensity below a nonlinear intensity threshold level for nonlinear SPM in the linear optical processing module. The length of optical propagation of the linear optical processing module is set at a value that causes an amount of anomalous optical dispersion in the spectrally broadened laser pulses that compensates for the frequency chirp produced by the nonlinear optical processing module to produce output laser pulses that are spectrally broadened and are compressed in the pulse duration in time.

In another aspect, a device for generating ultrashort laser pulses is provided to include a laser head housing includes an input fiber connector port structured to connect to a terminal port of a fiber cable to receive initial laser pulses and an output port for exporting laser pulses; a pulse compressor coupled to receive the initial laser pulses from the input fiber connector port and configured to compress a pulse duration of each laser pulse; a nonlinear optical processing module in the laser head housing coupled to receive the initial laser pulses from the pulse compressor to cause nonlinear self-phase modulation (SPM) on each laser pulse to create spectral broadening of, and an amount of frequency chirp in, each of the laser pulses due to the nonlinear SPM; and a linear optical processing module with anomalous dispersion inside the laser head housing that is optically coupled to receive the spectrally broadened laser pulses from the nonlinear optical processing module at an optical intensity below a nonlinear intensity threshold level for nonlinear SPM in the linear optical processing module. The length of optical propagation of the linear optical processing module is set at a value that causes an amount of anomalous optical dispersion in the spectrally broadened laser pulses that compensates for the frequency chirp produced by the nonlinear optical processing module to produce output laser pulses that are spectrally broadened and are compressed in the pulse duration in time.

In yet another aspect, a method is provided for generating ultrashort laser pulses by separating a nonlinear processing of laser pulses via nonlinear self-phase modulation (SPM) in a nonlinear optical material from a subsequent linear processing of the laser pulses to achieve ultrashort laser pulses. This method includes directing input laser pulses into a nonlinear optical material exhibiting normal dispersion to have an optical intensity that reaches at or above an intensity threshold for SPM in the nonlinear optical material to cause spectral broadening of, and an amount of frequency chirp in, each of the laser pulses due to the nonlinear SPM; controlling an intensity of spectrally broadened laser pulses output from the nonlinear optical material to be below a nonlinear intensity threshold level for nonlinear SPM in a linear optical material with anomalous dispersion that is optically coupled to receive the spectrally broadened laser pulses output from the nonlinear optical processing material without causing optical nonlinearity or the nonlinear SPM; and configuring a length of optical propagation of the linear optical processing module to cause an amount of anomalous optical dispersion in the spectrally broadened laser pulses to compress a pulse width in time to produce output laser pulses.

These and other aspects, their implementations and other features are described in detail in the drawings, the description and the claims.

DETAILED DESCRIPTION

Figure 1A:
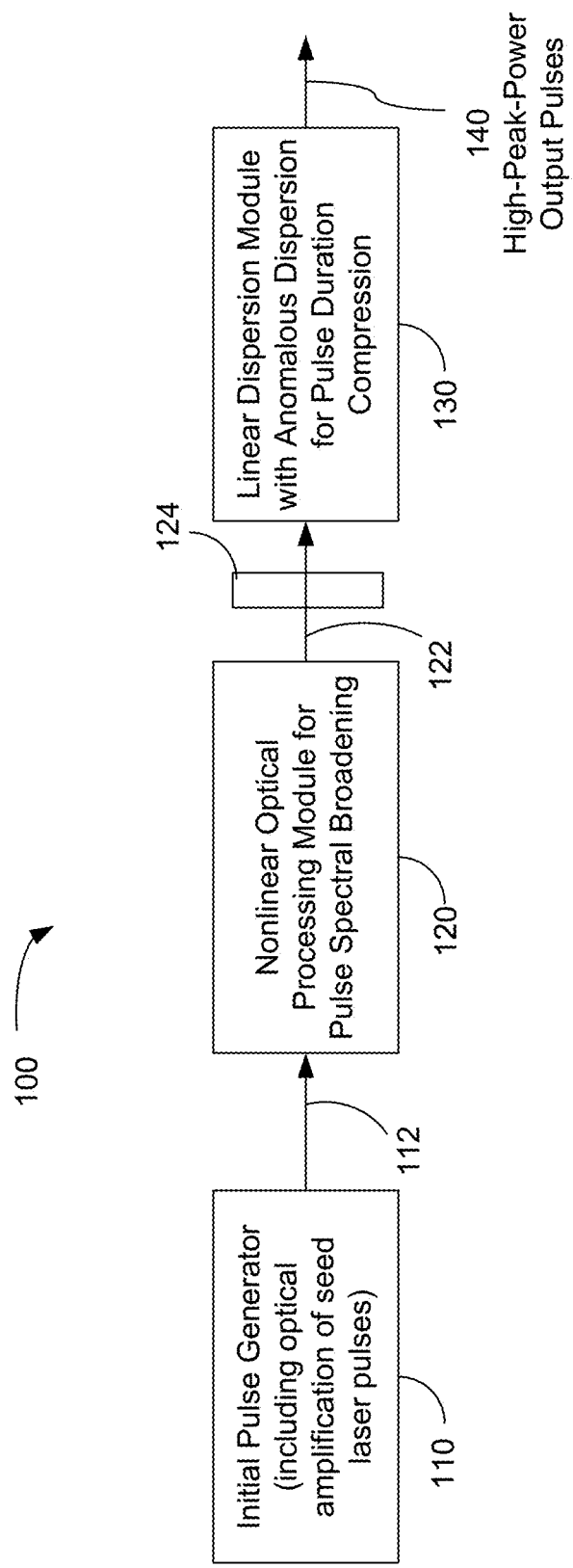
FIGS. 1A and 1B show an example of a system for generating ultrashort laser pulses based on a two-stage pulse processing approach which separates a nonlinear processing of laser pulses via nonlinear self-phase modulation (SPM) in a nonlinear optical medium to achieve sufficient spectral broadening from a subsequent linear processing of the laser pulses via a dispersion compensation of the chirp caused in the SPM to compress the spectrally broadened pulses

The pulse energy of a laser pulse can be estimated by the product of the pulse length and the pulse peak power. Short pulses at a given pulse energy can have high peak power. For example, a pulse with a pulse energy of 1 microJ and a pulse width of 1 psec has a peak power of 1 MWatt. The high peak power due to a short pulse duration can be desirable in various applications. When the pulse with high peak power is focused into a small spot, the electric field strength is sufficient to affect the electrons in the material thereby creating plasma effects. This plasma effect permits removal of material at a spatially confined area without creating thermal effects that affect surrounding areas—a process referred to as cold ablation. By comparison, some lasers with longer pulse lengths in contrast remove material through a heat creating substantial heat affected zones with distorted material around the area. In various ablation applications, such as laser surgery, a spatially confined, precisely targeted removal of a tissue or material at a given location is highly desirable and can be achieved by using cold ablation with laser pulses of short pulse durations less than 1 pico second and a high pulse energy such as more than 10 nJ.

However, there are various technical challenges in generating laser pulses of short pulse durations of a fraction of 1 pico second (e.g., around or less than 100 fs) and a high pulse energy such as more than 10 nJ. For example, the high electric field due to the high peak power in a USP laser may also damage the laser or create distortions in the laser as the laser pulse interactions with the gain material or other optical elements of the USP laser. One of common contributors to optical distortions is nonlinear optical effects. For example, stimulated Raman Scattering (SRS) is a non-linear optical interaction of light and optical phonon in the material when the intensity of light at an optical wavelength exceeds a SRS threshold. When SRS occurs, a Raman signal is generated in the same propagation direction of the original light by the non-linear SRS process in the medium at a Raman frequency that is shifted from the optical frequency of the original light by a Raman frequency detuning. The SRS can lead to undesired effects in optical pulse amplification in fibers and other optical media. For example, as the intensity of the optical pulses increases to reach the SRS threshold level, the optical power in the optical pulses is depleted and thus the SRS process puts an upper limit to the optical power of the optical pulses. Also, optical nonlinear effects such as self-phase modulation (SPM) based on Kerr effect can accumulate as the pulses propagate and SPM usually generate new spectral components and nonlinear frequency chirp, making it difficult to obtain short pulses which are desirable in various pulsed laser applications, such as laser material processing and other applications.

One known technique for mitigating the above undesired effects associated with high power short laser pulses is the chirped pulse amplification (CPA) where a train of short laser pulses are firstly stretched to a large duration (e.g., about hundreds of picoseconds), and then amplified by one or more fiber amplifiers to increase the pulse energy while maintaining the undesired nonlinear optical effects and pulse distortions below a desired tolerance level due to the stretched long pulse duration. After the amplification, the stretched and amplified laser pulses are finally compressed to a desired short pulse duration (e.g., 1 ps) to achieve high-peak-power and short laser pulses. Due to various technical limitations in CPA devices, it is known that it is difficult to achieve short laser pulses of less than 250 fs in CPA devices at the C band wavelength. For example, the gain bandwidth of the one or more amplifiers in a CPA device is limited and this limited gain bandwidth is insufficient to support laser pulses with a short pulse duration below 250 fs. Many commercial C-band erbium-doped amplifiers have a spectral range approximately from 1530 nm to 1565 nm, the gain bandwidth of such erbium-doped fiber amplifiers is not sufficiently broad to support pulses generated with CPA technique with a duration of less than 200 fs.

Attempts were also made by combining effects of both self-phase-modulation (SPM) and anomalous dispersion in a fiber segment to compress a pulse duration of laser pulses through the high order solution compression. High order solutions are defined by their solution numbers N where a solution number N is the square root of the ratio of the input-pulse energy to the corresponding pulse energy of the fundamental solution. Such high order solution compression requires delicate control and engineering of the fiber segment that provides the adequate levels of the self-phase-modulation and anomalous dispersion to support the proper high-order solution pulses that experience significant compression at the fiber exit. For example, hollow-core photonic crystal fiber filled with gases may be specifically designed to this high order solution compression. However, exotic fibers based on hollow-core photonic crystal fiber filled with gases or other designs are not easy to use, difficult and expensive to fabricate, and are usually unstable. Therefore, such exotic fibers are generally unsuitable to be utilized in commercial products. In using a single-mode fused-silica fiber to achieve high-order solution compression, one of technical issues is a poor pulse quality factor of the compressed laser pulses. The pulse quality factor $Qc$ is a fraction of the input pulse energy appearing in the main pulse body due to splitting of the input pulse in time into the main sharp pulse body in time and sidelobes or pedestals before/after the main sharp pulse body in time. The nonlinearity in a single-mode fused-silica fiber can scale cubically with the intensity of light in a laser pulse and the chromatic dispersion of the fiber remains the same for light at different intensity levels. This condition creates a large solution number N and produces a low pulse quality factor. For example, ultrashort pulses with solution number N of 30 and initial pulsewidth of 300 fs can yield compressed pulse width pulsewidth as short as 25 fs=. However, the pulse quality factor $Qc$ decreases significantly with increasing of the solution number. In this example, the pulse quality factor $Qc$ is estimated to be around 0.2, indicating only 20% of the energy constitutes the main part of the pulse, while the remainder is wasted as a broad pedestal around the compressed main part of the pulse. The presence of the sidelobes or pedestals before/after the main sharp pulse body in time is largely due to the fact that the chirp generated through the nonlinear self phase modulation in the fiber segment cannot be fully compensated by the chirp generated by the anomalous dispersion in the same fiber segment. As a result, the peak power of the compressed pulse is significantly reduced.

Due to the above and other technical difficulties or issues, it has been difficult to commercialize high power fiber lasers (e.g., above 10 nJ) with a short pulse duration of less than 250 fs.

The techniques, devices and systems described in this document can be implemented to generate ultrashort laser pulses by using a two-stage pulse processing approach which separates a nonlinear processing of laser pulses via nonlinear self-phase modulation (SPM) in a nonlinear optical medium to achieve sufficient spectral broadening from a subsequent linear processing of the laser pulses via a dispersion compensation of the chirp caused in the SPM to compress the spectrally broadened pulses, thus achieving ultrashort laser pulses with a high pulse quality factor. In the nonlinear optical processing module, the optical intensity of the laser pulses is set at or above an intensity threshold for SPM in the nonlinear optical processing module to cause spectral broadening of, and an amount of frequency chirp in, each of the laser pulses due to the nonlinear SPM. The SPM generates new frequency components at the upper and lower sides of the spectral band of the original laser pulse and thus broadens the spectral band of the laser pulse. This spectral broadening should be sufficiently broad as a necessary condition for creating ultrashort pulses with a short pulse duration given the inverse relationship between the pulse duration and the spectral width of a laser pulse. The new frequency components generated by the SPM, however, have positive and nonlinear frequency chirps that can generate side lobes or pedestals outside the main pulse profile in the time domain. Such frequency chirps caused by SPM are undesirable because they degrade the pulse quality factor and reduce the total optical energy in the main pulse body. The subsequent linear optical processing module is configured to exhibit anomalous dispersion and the optical intensity of spectrally broadened laser pulses output from the nonlinear optical processing module is controlled to be below a nonlinear intensity threshold level for nonlinear SPM to occur in the linear optical processing module. The optical propagation length in the linear optical processing module is set to provide sufficient dispersion compensation by the anomalous dispersion to compensate for the chirp in the laser pulses caused in the nonlinear optical processing module without causing noticeable optical nonlinearity or the nonlinear SPM in the linear optical processing module. This dispersion compensation in the nonlinear optical processing module causes pulse duration narrowing.

FIG. 1A shows an example of a system 100 for generating ultrashort laser pulses based on the above two-stage pulse processing approach. The system 100 includes an initial pulse generator 110 that produce initial input laser pulses 112 with a desired total optical energy per pulse and an initial pulse duration. The system 100 is designed to compress the initial pulse duration into a shorter pulse duration to achieve a desired high peak power while achieving a good pulse quality factor. A nonlinear optical processing module 120 is provided to cause nonlinear self-phase modulation (SPM) on each input laser pulse to create spectral broadening of, and an amount of frequency chirp in, each of the laser pulses due to the nonlinear SPM. The optical intensity of each input laser pulse to the nonlinear optical processing stage 120 is controlled to be at or above an intensity threshold for SPM in the nonlinear optical processing stage 120. As a result, the nonlinear optical processing stage 120 produces spectrally broadened laser pulses 122. Downstream from the nonlinear optical processing stage 120 is a linear optical processing module 130 with anomalous dispersion that is optically coupled to receive the spectrally broadened laser pulses 122. The optical intensity of spectrally broadened laser pulses 122 output from the nonlinear optical processing module 120 is controlled to be below a nonlinear intensity threshold level for nonlinear SPM in the linear optical processing module 130. Therefore, the anomalous dispersion is introduced to the spectrally broadened laser pulses 122 without causing optical nonlinearity or the nonlinear SPM. The length of optical propagation of the linear optical processing module 130 is controlled to cause a proper amount of anomalous optical dispersion in the spectrally broadened laser pulses that compensates for the frequency chirp produced by the nonlinear optical processing module 120. This dispersion compensation in turn causes compression of the pulse width in time to produce output laser pulses 140 that are spectrally broadened and are compressed in the pulse duration in time with respect to spectral width and pulse duration of the input laser pulses 112. In implementations, the optical materials for both processing moduels modules 120 and 130 may exhibit anomalous dispersion and are operated under different optical operating conditions: the module 120 is operated in the nonlinear optical regime to produce SPM in each laser pulse and the module 130 is operated in the linear optical regime to produce a frequency chirp that counters the SPM-induced frequency chirp in each laser pulse. For example, both modules may use fused silica fiber materials with anomalous dispersion material properties.

Figure 1B:
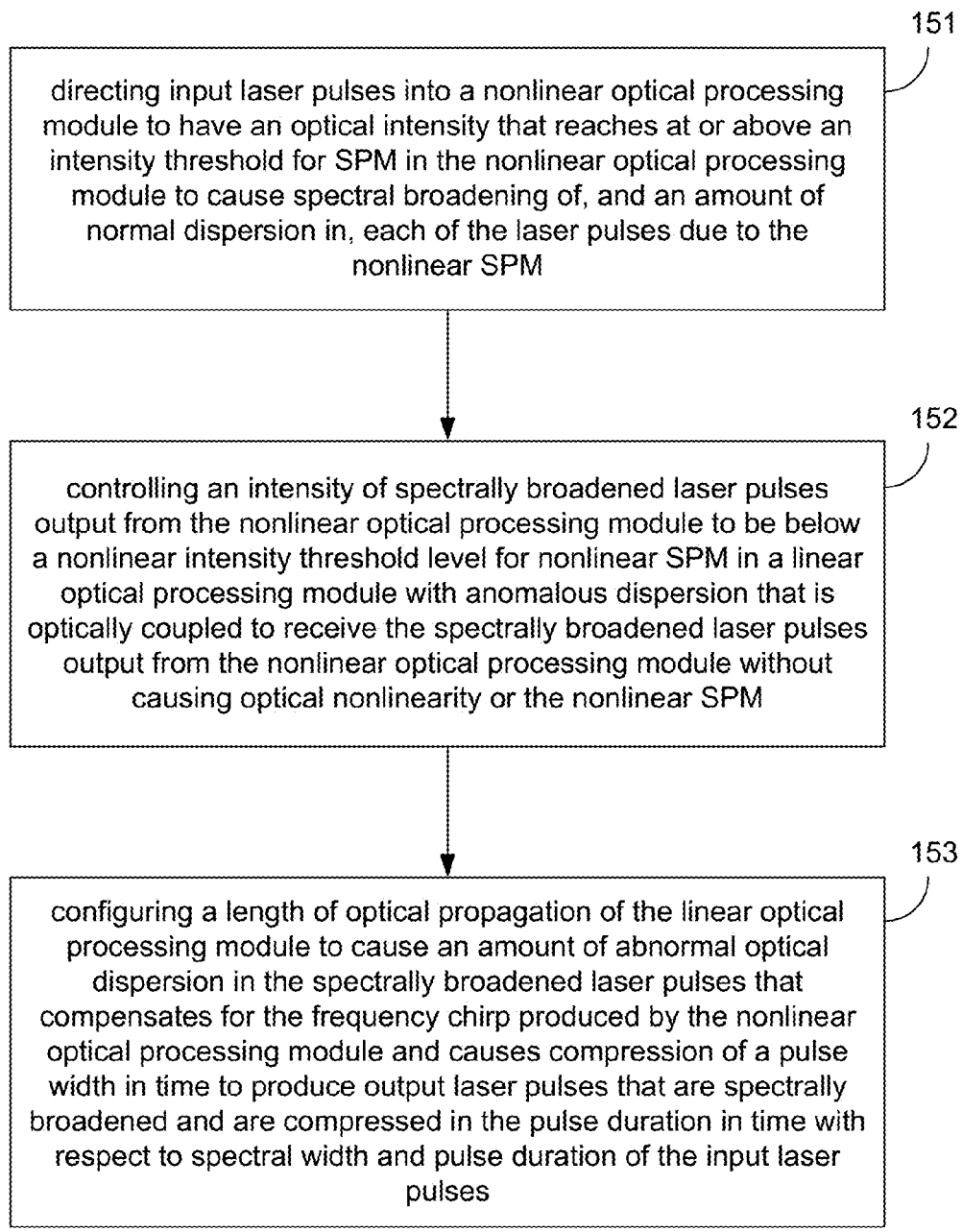

FIG. 1B shows the operation of the two stage processing in the modules 120 and 130 in the system 100 of FIG. 1A. At step 151, input laser pulses are into the nonlinear optical processing module 120 to have an optical intensity that reaches at or above an intensity threshold for SPM in the nonlinear optical processing module 120 to cause spectral broadening of, and an amount of frequency chirp in, each of the laser pulses due to the nonlinear SPM. At step 152, the intensity of spectrally broadened laser pulses output from the nonlinear optical processing module 120 are controlled to be below a nonlinear intensity threshold level for nonlinear SPM in the linear optical processing module 130 with anomalous dispersion that is optically coupled to receive the spectrally broadened laser pulses output from the nonlinear optical processing module 120 without causing optical nonlinearity or the nonlinear SPM. Referring to FIG. 1A, a beam control device 124 can be provided between the modules 120 and 130 to control the optical intensity of the laser pulses 122 that enter the module 130. A beam expander, for example, may be included in the device 124 to expand the beam cross section to reduce the optical intensity without losing optical energy in each laser pulse. At step 153, the length of optical propagation of the linear optical processing module is controlled to cause an amount of abnormal optical dispersion in the spectrally broadened laser pulses that compensates for the frequency chirp produced by the nonlinear optical processing module 120 and causes compression of a pulse width in time to produce output laser pulses that are spectrally broadened and are compressed in the pulse duration in time with respect to spectral width and pulse duration of the input laser pulses.

Under this two-stage processing, the spectral broadening of each laser pulse in the nonlinear optical processing module 120 and the pulse duration narrowing in the subsequent linear optical processing module 130 collectively create ultrashort laser pulses 140 with a good pulse quality factor. In implementations, the above two-stage processing in the system 100 is performed after optical amplification of the laser pulses in the initial pulse generator 110 to a sufficient amount of the total pulse energy per pulse. The initial pulse generator 110 may, in some implementations, include a seed pulse laser and one or more optical amplifiers that amplify the seed laser pulses. Therefore, the limited spectral range in the optical gains of various optical amplifiers that may be used in the initial pulse generator 110, such as Er doped and Er—Yb doped silica fibers and other fiber amplifiers, do not present a limit to the lower limit of the pulse duration in laser pulses processed by the combination of the nonlinear optical processing module 120 and linear optical processing module 130 that are downstream from the optical amplification stage 110. The spectral broadening of each pulse in the nonlinear optical processing module 120 mitigates the undesired effect of the limited spectral range in the optical gains of various optical amplifiers in the stage 110 by providing a sufficient spectral breath of each pulse that matches the desired short pulse duration that is to be produced by the two-stage processing by modules 120 and 130. As a result, various pulse generation and amplification techniques, devices and systems can be used as part of the stage 110 to generate the initial laser pulses 112 with sufficient per-pulse energy for processing by the two-stage processing described in this document, including various optical amplifier designs such as a core pump fiber amplifier, a double clad fiber amplifier (DCA), a combination of a core pump fiber amplifier and a double clad fiber amplifier, and other amplifier designs such as solid state laser amplifiers. A solid state laser gain medium can be optically pumped by, e.g., diode lasers or flash light pump. In various amplifier designs, solid state laser amplifiers can be used to provide the last stage amplification in a multi-stage amplifier design due to their large cross sections. Exemplary materials used for solid state amplifiers include Er:glass, and others. Also, CPA systems in various configurations can be used to generate the input laser pulses to the two-stage processing described in this document.

Notably, the separation of the above two-stage processing approach between a spectral broadening in the nonlinear optical processing module 120 and the subsequent pulse duration narrowing in the linear optical processing module 130 provides flexibility and ability of separately engineering or optimizing the parameters of the nonlinear optical processing module 120 for desired spectral broadening from engineering or optimizing of the parameters of the subsequent linear optical processing module 130 for desired pulse duration narrowing. In one implementation of the present two-stage processing, a single mode fiber can be used to generate high-peak-power femtosecond laser by separately taking the advantage of spectral broadening via self-phase modulation in the first stage and pulse duration narrowing or compression based on chromatic dispersion effect in a linear optical module as the second stage following the first stage. In the first stage 120, nonlinearity in the fiber dominates and is used to broaden the spectrum, while in the second stage 130; the dispersion of a dispersive material dominates and is used to compress the pulse and obtain transform-limited femtosecond pulses based on the broadened spectral width of each pulse in the first stage. Optical nonlinearity at the second stage 130 is avoided or minimized, e.g., through beam expansion which effectively reduces the peak power.

This two-stage processing approach can be implemented to overcome constraints and or technical difficulties in other short pulse generation techniques. For example, in the high order solution compression, the optical nonlinearity and optical dispersion of the same nonlinear optical medium must be simultaneously managed to create the desired condition for supporting high-order solution propagation of light and for achieving the desired pulse compression. This aspect of the high order solution compression poses significant practical challenges in finding practical and suitable nonlinear optical materials in commercialization of the high order solution compression technology. In addition, the requirement of simultaneously managing the optical nonlinearity and optical dispersion of the same nonlinear optical medium in the high order solution compression compromises the pulse quality factor in the resultant optical pulses.

Figure 1C:
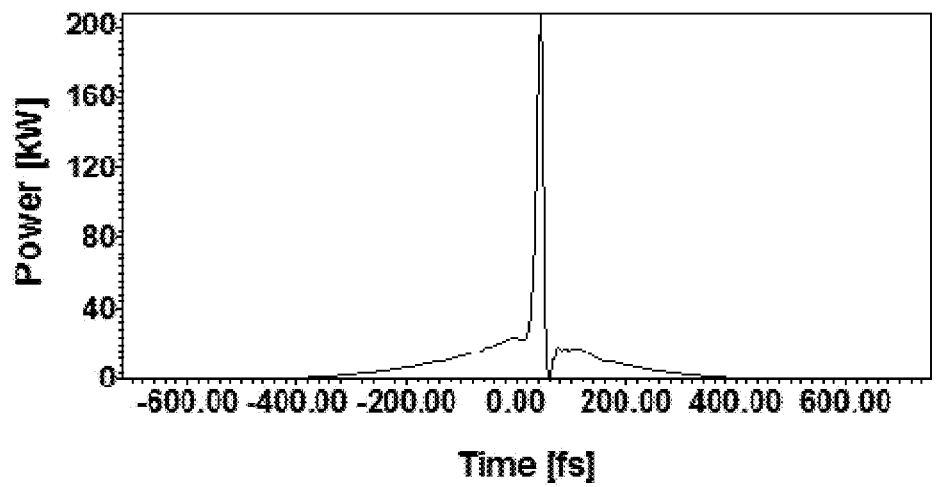
FIG. 1C shows an example of a pulse generated via high order solution compression where a pulse with a pulse energy of 10 nJ and an initial duration 400 fs is injected into a nonlinear fiber segment to generate a compressed pulse with a duration of 14 fs through the solution compression.

FIG. 1C shows an example of a pulse generated via high order solution compression where a pulse with a pulse energy of 10 nJ and an initial duration 400 fs is injected into a nonlinear fiber segment to generate a compressed pulse with a duration of 14 fs through the solution compression. The final compressed pulse, although having a rather short pulse duration of only 14 fs, has a large pedestal to leave only 33% of the energy in the main pulse. This poor pulse quality factor significantly compromises the usable energy in the final compressed pulse. This undesired aspect of the high order solution compression is inherent in its design. The chirp generated through SPM in the nonlinear fiber segment in the high order solution compression is directly proportional to the pulse shape. As the nonlinearity accumulates in the pulse as it propagates in the nonlinear fiber segment, the pulse shape undergoes a complicated evaluation due to interplay between SPM and dispersion and can deviate significantly from its original shape. As a result, the chirp developed in the pulse can be highly nonlinear, particularly at the wing part of the pulse. On the dispersion side, however, the chirp generated by dispersion tends to be linear. This mismatch between SPM-induced chirp and dispersion-induced chirp in the high order solution compression leads to the poor pulse quality factor in the final compressed pulse.

The two-stage processing approach shown in the system 100 in FIG. 1A can mitigate this by allowing separately engineering the spectral broadening via SPM in the nonlinear optical processing module 120 and engineering the pulse narrowing via the anomalous dispersion in the linear optical processing module 130 to enable the SPM-induced dispersion to be compensated or completely canceled by the anomalous dispersion. This separation nonlinearity from dispersion allows proper limit on the overall nonlinearity in the spectrum broadening in the nonlinear optical processing module 120 to substantially maintain the original Gaussian like pulse shape while introducing a linear or quasi-linear frequency chirp. This chirp from the nonlinear optical processing module 120 can be compensated by the dispersion chirp generated in the pulse narrowing step in the linear optical processing module 130 to produce the compressed pulse without significant pulse distortion. Accordingly, the present two-stage approach can be used to achieve better pulse quality factor than various implementations of the high order solution compression and other pulse generation methods. As described in some implementation examples below, the two-stage approach can be repeated to further narrow the pulse duration where the overall compression process is divided into multiple compression steps. In each step, the two stages are carefully engineered to avoid or minimize the undesired pulse distortion. The multi-step processing enables to achieve the final pulse quality by matching the chirp generated by SPM and the chirp generated by the dispersion.

Figure 1D:
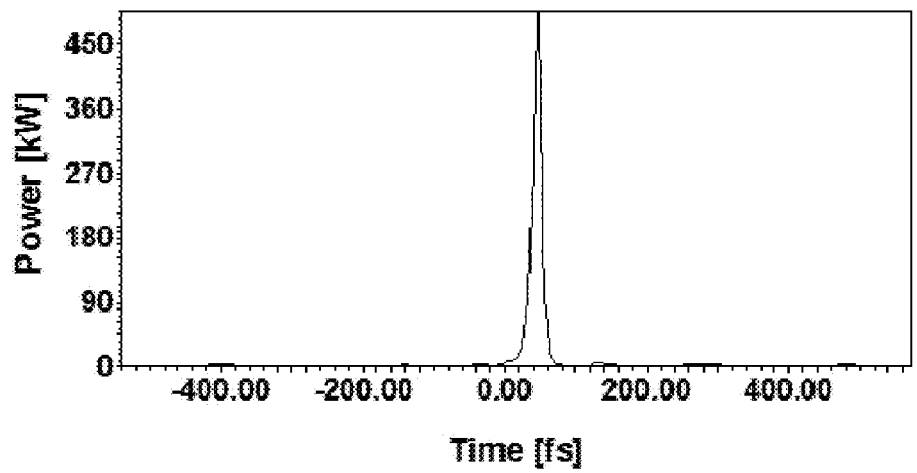
FIG. 1D shows an example of the pulse quality of a compressed pulse obtained through the present two-stage processing approach as a comparison with the compressed pulse based on the high order solution compression in FIG. 1C.

FIG. 1D shows an example of the pulse quality of a compressed pulse obtained through the present two-stage processing approach as a comparison with the compressed pulse based on the high order solution compression in FIG. 1C. Although both compressed pulses in FIGS. 1C and 1D have a pulse duration for FWHM of 14 fs but the compressed pulse through present two-stage processing approach has more than 80% of energy confined in the main pulse while there is only 33% of energy in the main pulse through high order solution compression. This represents a difference in the pulse peak power over a factor of 3 between the present two-stage processing approach and the high order solution compression.

As another example, the two-stage processing approach shown in the system 100 in FIG. 1A can be advantageously used to provide flexibility in choosing the compressed pulse width. The compression factor can be controlled by the amount of spectral broadening in the nonlinear optical processing module 120. This amount of spectral broadening that each pulse experiences can be controlled by either controlling the physical properties of the nonlinear optical processing module 120 or controlling the numbers of spectral broadening-dispersion compression cycle that each pulse goes through. It is difficult to achieve such flexibility in the pulse width with other short pulse generation techniques. For example, in the high order solution compression, the compression factor is determined by the solution order N.

Therefore, the present two-stage processing approach as shown in FIG. 1A can be implemented to provide significant advantages in generation of laser pulses with ultrashort pulse durations, high peak power levels and good pulse quality. The present two-stage processing approach also provides significant engineering flexibility, affords cost savings and enables compact system designs for various applications. Notably, high-peak-power fiber lasers for generating femtosecond laser pulses can be used in various applications in industrial and scientific fields, such as surgery, high-precision material processing, frequency conversion, etc. Due to the waveguiding effect of optical fiber, fiber lasers possess many advantages over bulk solid-state lasers in terms of stability, compactness, ease of operation, better beam quality and other aspects. The present two-stage processing approach can be implemented in designs that use fiber segments or components to provide compact packages for surgery and other laser systems.

Specific examples of implementation of the present two-stage processing approach as shown in FIG. 1A and other two-stage processing approach are provided below.

Figure 2:
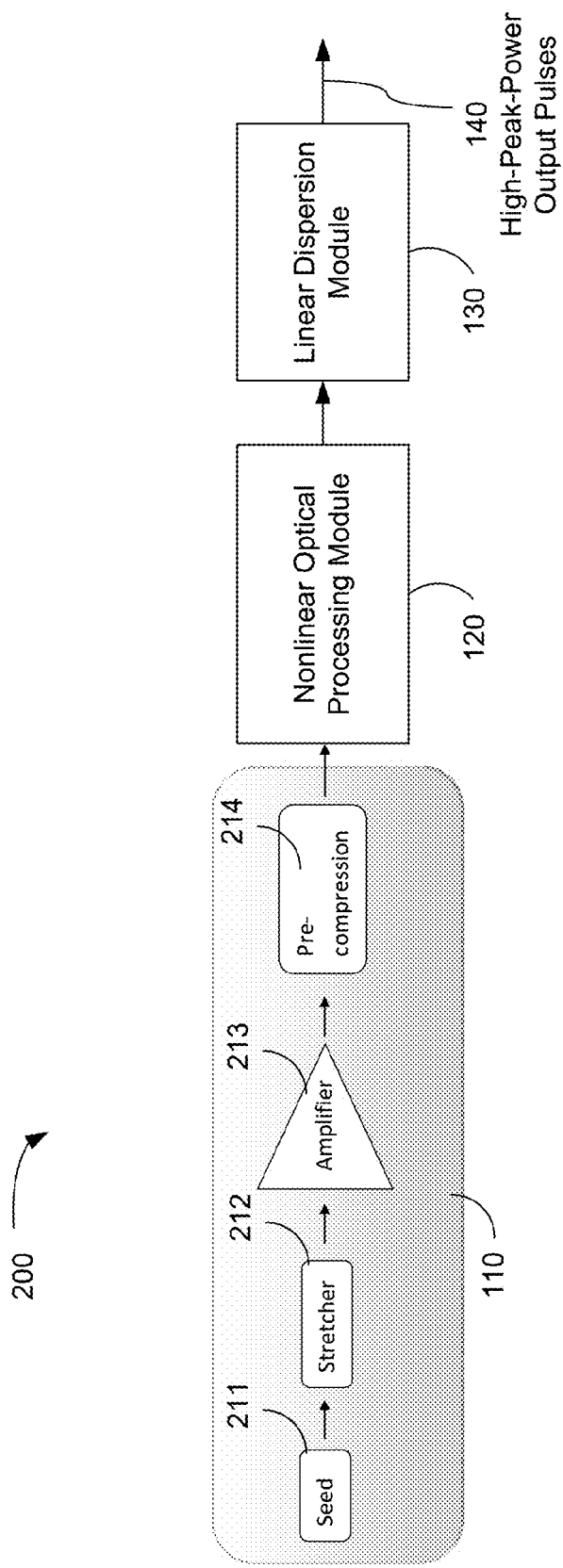
FIG. 2 shows an exemplary system 200 that uses a CPA system as the initial pulse generator 110 in implementing the system 100 in FIG. 1A.

FIG. 2 shows an exemplary system 200 that uses a CPA system as the initial pulse generator 110 in implementing the system 100 in FIG. 1A. The CPA system 110 in FIG. 2 includes a seed pulse laser 211 to produce seed laser pulses, a pulse stretcher 212 that processes the seed laser pulses to stretch the pulse duration, one or more optical amplifiers 213 that amplify the stretched laser pulses, and a pulse compression device 214 that compresses the pulse duration of laser pulses output by the one or more optical amplifiers 213. Each optical amplifier may be an ion-doped fiber amplifier such as an erbium-doped fiber amplifier in some implementations. The pulse compression device 214 may be implemented in various configurations (e.g., a grating pair with two gratings) and can be a pre-compression device since the subsequent two-stage processing in the modules 120 and 130 provides the desired pulse compression as needed for the system output. Such a CPA system is difficult to support an output with a pulse duration less than 250 or 200 fs. The output pulses of the CPA system 110 are initial laser pulses for the subsequent two-stage processing and propagate through highly nonlinear material in the module 120 to get spectral broadening and subsequently get pulse compression or narrowing in the module 130.

The compressed laser pulses produced based on the present two-stage processing can be further processed to achieve desired properties of laser pulses for specific applications. For example, the high peak power of the compressed laser pulses produced based on the present two-stage processing allows such pulse to have a high optical intensity suitable for subsequent nonlinear optical processing. A subsequent nonlinear optical module can be designed to receive the high peak power of the compressed laser pulses for frequency harmonic generation such as second or third harmonic generation, four-wave mixing (FWM), parametric oscillation, and others. Specifically, a Periodically Poled Lithium Niobate (PPLN) may be included in the subsequent nonlinear optical module as a frequency doubling material to obtain second harmonic generation (SHG), e.g., a SHG pulse with duration less than 100 fs and pulse energy more than 10 nJ. For another example, the high peak power of the compressed laser pulses produced based on the present two-stage processing can be directed into a subsequent optical filter to modify the spectral makeup of each laser pulse.

Figure 3A:
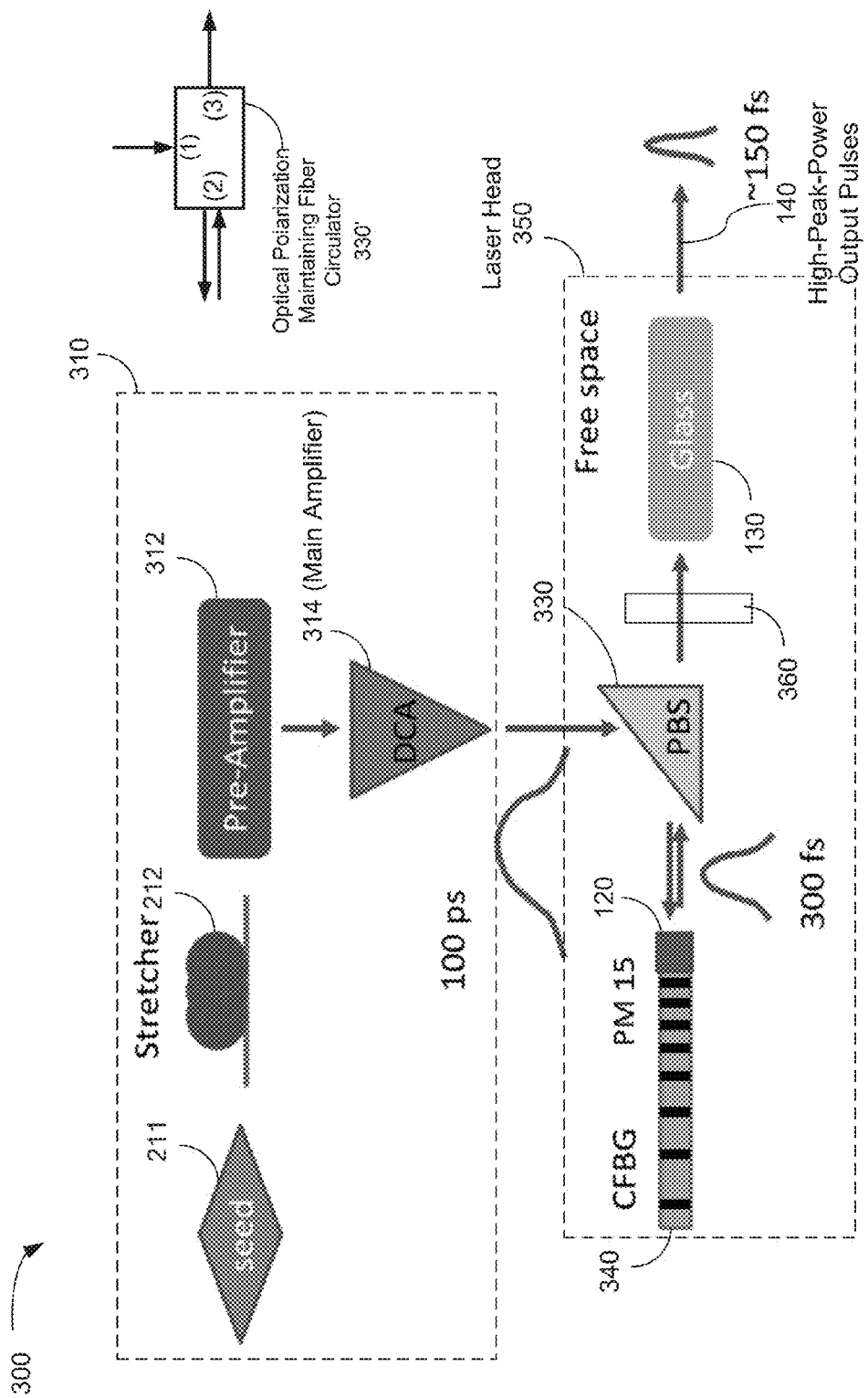
FIG. 3A shows another exemplary system 300 for implementing the design in FIG. 1A.

FIG. 3A shows another exemplary system 300 for implementing the design in FIG. 1A based on an initial pulse generator 310, a reflective chirped fiber Bragg grating 340, a nonlinear polarization-maintaining fiber segment as the nonlinear optical processing module 120 and a glass dispersion material as the linear optical processing module 130. The initial pulse generator 310 includes a seed pulse laser 211, a pulse stretcher 212, a pre-amplifier 312 and a double clad amplifier (DCA) as the main amplifier 314. For example, the seed laser pulses may have a central wavelength of 1550 nm, a pulse duration of 1 ps, and a spectral bandwidth of about 10 nm and are stretched by the pulse stretcher 212 to a long pulse with a duration of about 100 picoseconds. The stretched pulses are then sent to the preamplifier 312 and the main amplifier DCA 314 to obtain a high pulse power of about 30 nJ (with a pulse duration of about, e.g., 100 ps). Such initial laser pulses are then directed into the two-stage processing in the laser head 350 for processing. The laser head 350 can be configured as a compact module and is optically linked to the module 310 via a fiber cable.

In this example, the laser head 350 includes a polarizing beam splitter/combiner (PBS) 330 to direct the initial laser pulses from the module 310 into the nonlinear polarization-maintaining (PM) fiber segment 120 and the reflective chirped fiber Bragg grating (CFBG) 340. The pulses from the PBS 330 first pass through the PM fiber segment 120 and are reflected by the chirped CFBG 340 back to the PM fiber segment 120 again to pass through the PBS 330 to enter the glass dispersion material as the linear optical processing module 130. The PBS 330 in this and other examples can be replaced by an optical circulator with 3 ports that receives the light from the module 110, directs the received light to the CFBG 340 and directs the reflected light from the CFBG 340 to the subsequent stage. For example, a polarization maintaining fiber optic circulator 330' (shown as an inset in FIG. 3A) may be used to replace the PBS 330 where the optical circulator 330' has a first optical port (1), a second optical port (2) and a third optical port (3) to direct light received at the first optical port (1) to the second optical port (2) and to direct light received at the second optical port (2) to the third optical port (3).

The chirped fiber Bragg grating (CFBG) 340 operates as a pre compression device to compress the laser pulses to be transform-limited with an initial duration (e.g., 300 fs to 340 fs). The self phase modulation (SPM) for the spectral broadening is achieved in the polarization maintaining fiber (PM 15) 120 and broadens the pulse spectral width. The spectrally broadened pulses are coupled to free space after beam expansion to reduce the optical intensity by a beam control device 360 located between the PBS 330 and the module 130 so that the nonlinear optical effects in the module 130 can be minimized. The anomalous dispersion in the module 130 compensates the frequency chirp introduced by SMF in the PM fiber segment 120 and compresses the pulse to a transform limit pulse with a desired short duration (e.g., 110 fs).

In this example, the optical materials for both processing module 120 (the PM fiber) and the module 130 (a glass material) may use fused silica fiber materials that exhibit anomalous dispersion material properties. The PM fiber segment for the module 120 is operated in the nonlinear optical regime to produce SPM in each laser pulse and a positive frequency chirp in each newly generated frequency component by the SPM in the output pulse after the PM fiber segment 120. In this context, the PM fiber segment for the module 120 may appear to have a normal dispersion material property. The module 130 is operated in the linear optical regime to produce a frequency chirp based on its anomalous dispersion to compensate for the SPM-induced frequency chirp in each laser pulse, thus finally compressing the pulse output by the module 130 to a transform limited pulse with a short pulse duration (e.g., 110 fs).

Figure 12B:
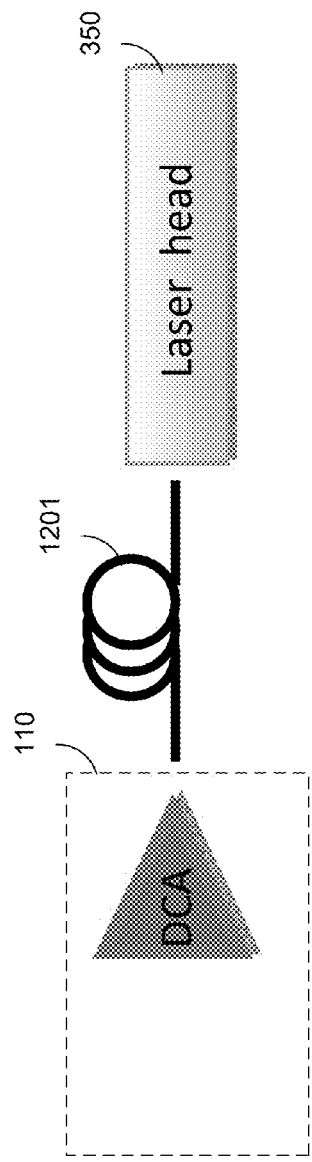
FIGS. 12A, 12B, 12C, 12D, 12E and 12F show examples and performance of compact designs for using a compact laser head to include components of the 2-stage processing.
Figure 12A:
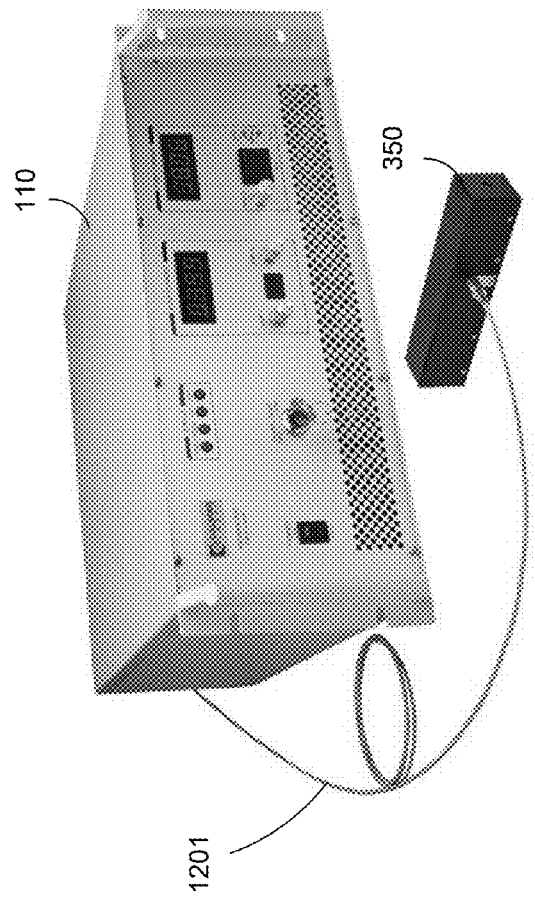

FIGS. 3B through 3G shoe examples of preliminary test results of the design in FIG. 3A. Improved test results of device and system implementations are shown in FIGS. 12D, 12E and 12F in connections with the designs in FIGS. 12A, 12B and 12C.

Figure 3B:
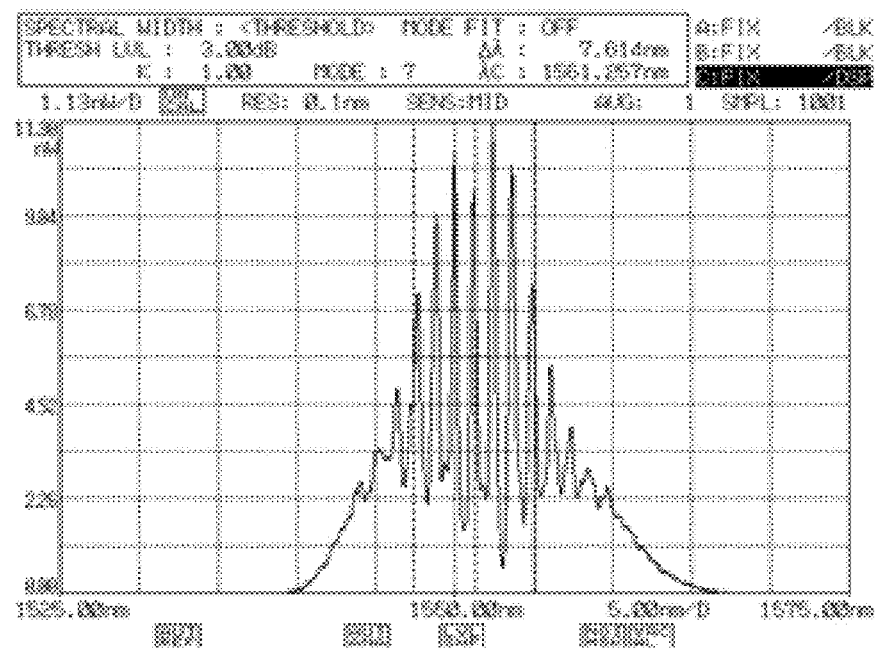
FIGS. 3B, 3C, 3D, 3E, 3F and 3G show examples of preliminary test results of pulse generation based on the design in FIG. 3A.
Figure 3C:
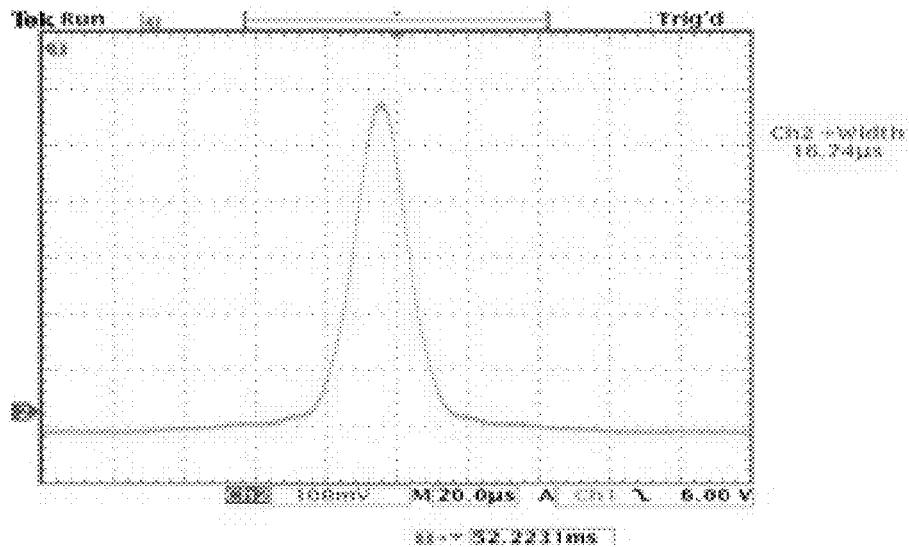
Figure 3D:
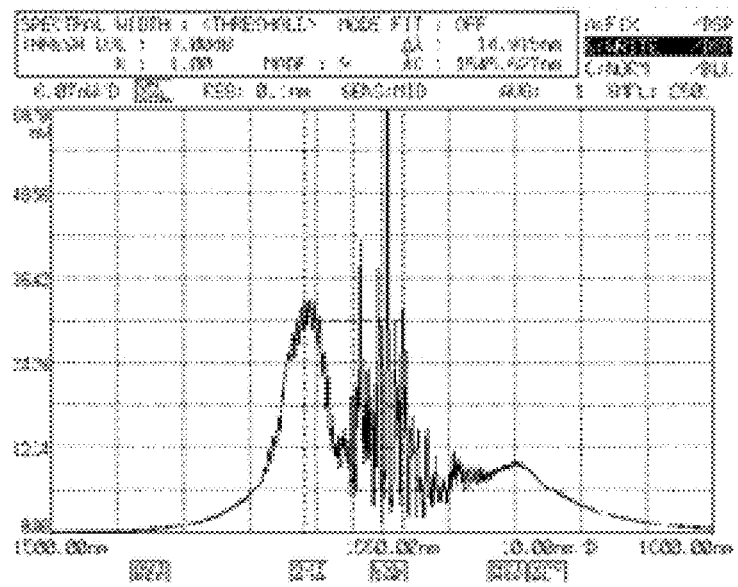
Figure 3E:
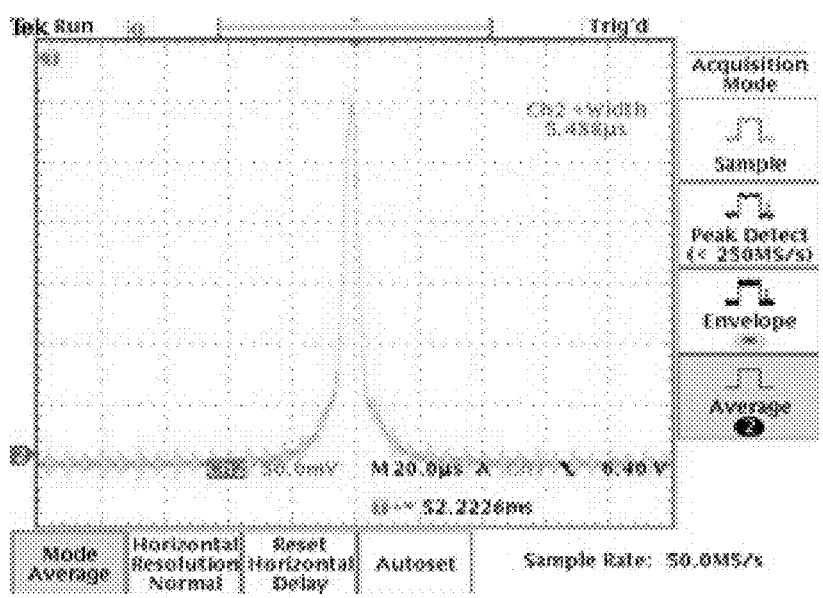

FIGS. 3B and 3C show examples of the pulse spectrum and pulse autocorrelation after the CFBG 340 in FIG. 3A where a transform-limited pulse with a duration of 340 fs and a bandwidth of 10 nm is generated. FIGS. 3D and 3E show examples of pulse spectrum and pulse autocorrelation after the SPM by the fiber segment 120 and dispersion compensation by the glass material in the module 130. An ultrashort pulse with a duration of 110 fs is generated. The pulse power is measured to be 30 nJ with a peak power of 250 kW.

Figure 3F:
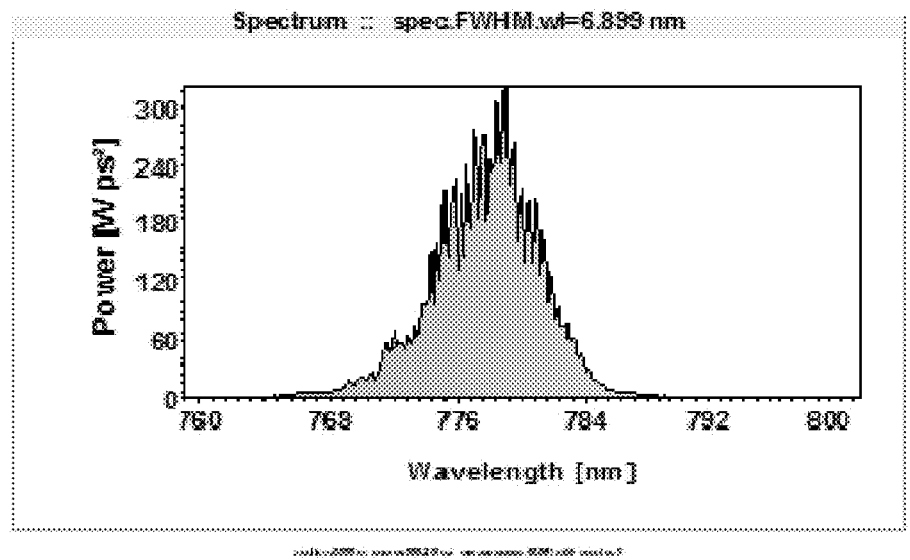
Figure 3G:
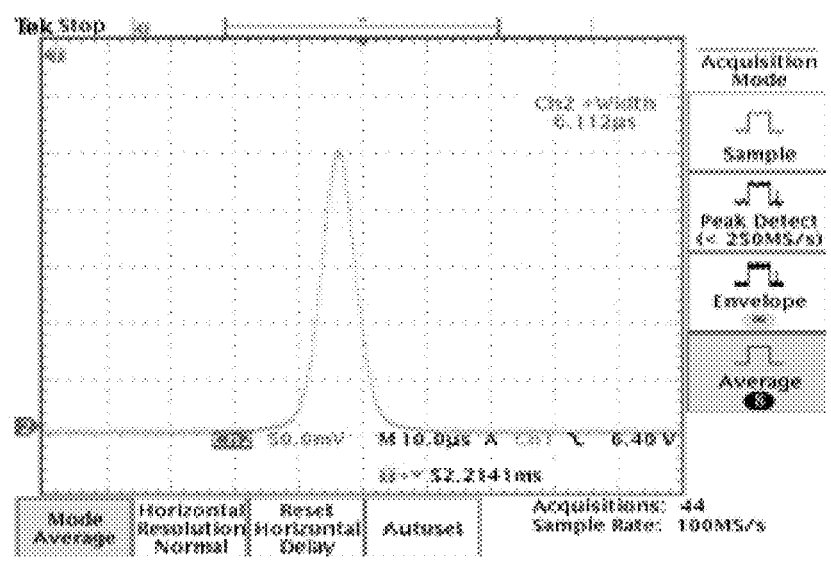

The output pulses from the exemplary system in FIG. 3A can be further focused to a nonlinear crystal to generate ultrashort pulse at a different wavelength. FIGS. 3F and 3G show an example of the second harmonic generation by using a PPLN. An ultrashort pulse at 780 nm with duration of 120 fs and bandwidth of 6.9 nm is obtained. The pulse power is measured to be 12 nJ with a peak power of 100 kW.

Figure 4:
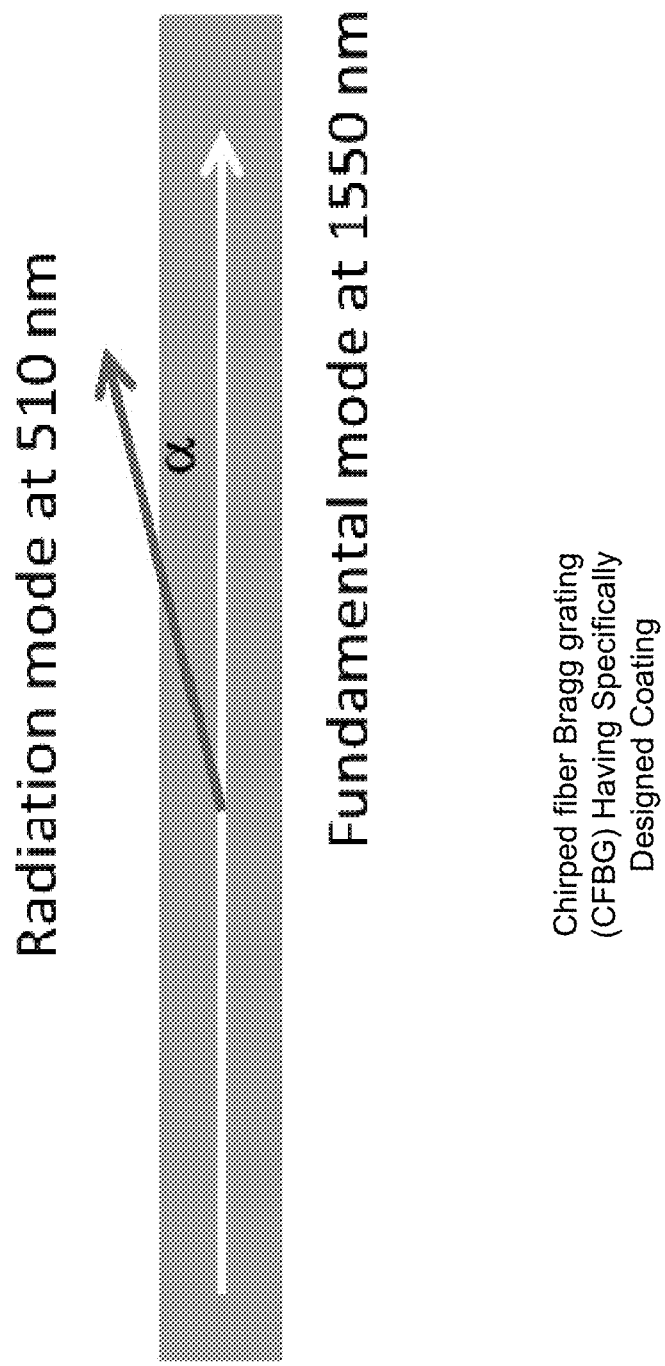
FIG. 4 illustrates Cerenkov radiation type phase matching in CFBG. Fundamental mode is phase matched with radiation mode propagating in the cladding.

In FIG. 3A and other designs where a CFBG device is used to pre-compress laser pulses for subsequent two-stage processing, various CFBG devices tend to be temperature sensitive components. The high peak power of laser pulses in CFBG can cause third-order harmonic generation (THG) due to Cerenkov radiation type phase matching so that green THG light is generated in the fiber of the CFBG. FIG. 4 illustrates Cerenkov radiation type phase matching in CFBG. Fundamental mode is phase matched with radiation mode propagating in the cladding. The phase matching angle α may be around 10° in some commercial CFBG devices.

The green THG light can be absorbed by the high index coating of the CFBG. This absorption can induce a non-uniform heat gradient along the CFBG which alters, undesirably, the dispersion of the CFBG. This heat problem in CFGB can limit the pulse power and stability in the system. It is difficult to eliminate this type of phase matching since the phase matching angle is continuous. Some examples of practical ways to reduce the influence of THG include using a specific coating outside the CFBG that is transparent to the green light, or using a low index coating outside the CFBG where the third harmonic generation is confined in the cladding and not absorbed by the coating.

Referring to FIG. 1A, the dispersion compensation by the linear optical processing module 130 in the two-stage processing should be designed to produce the proper amount of the anomalous dispersion that matches the frequency chirp introduced by the SPM in the upstream nonlinear optical processing module 120. One way to achieve this match is to design the module 130 to be tunable in its optical propagation length to allow for adjustment of the amount of the anomalous dispersion in the module 130 so that the dispersive material in the module 130 can compress the pulse to a pulse duration by the transform limit.

Figure 5:
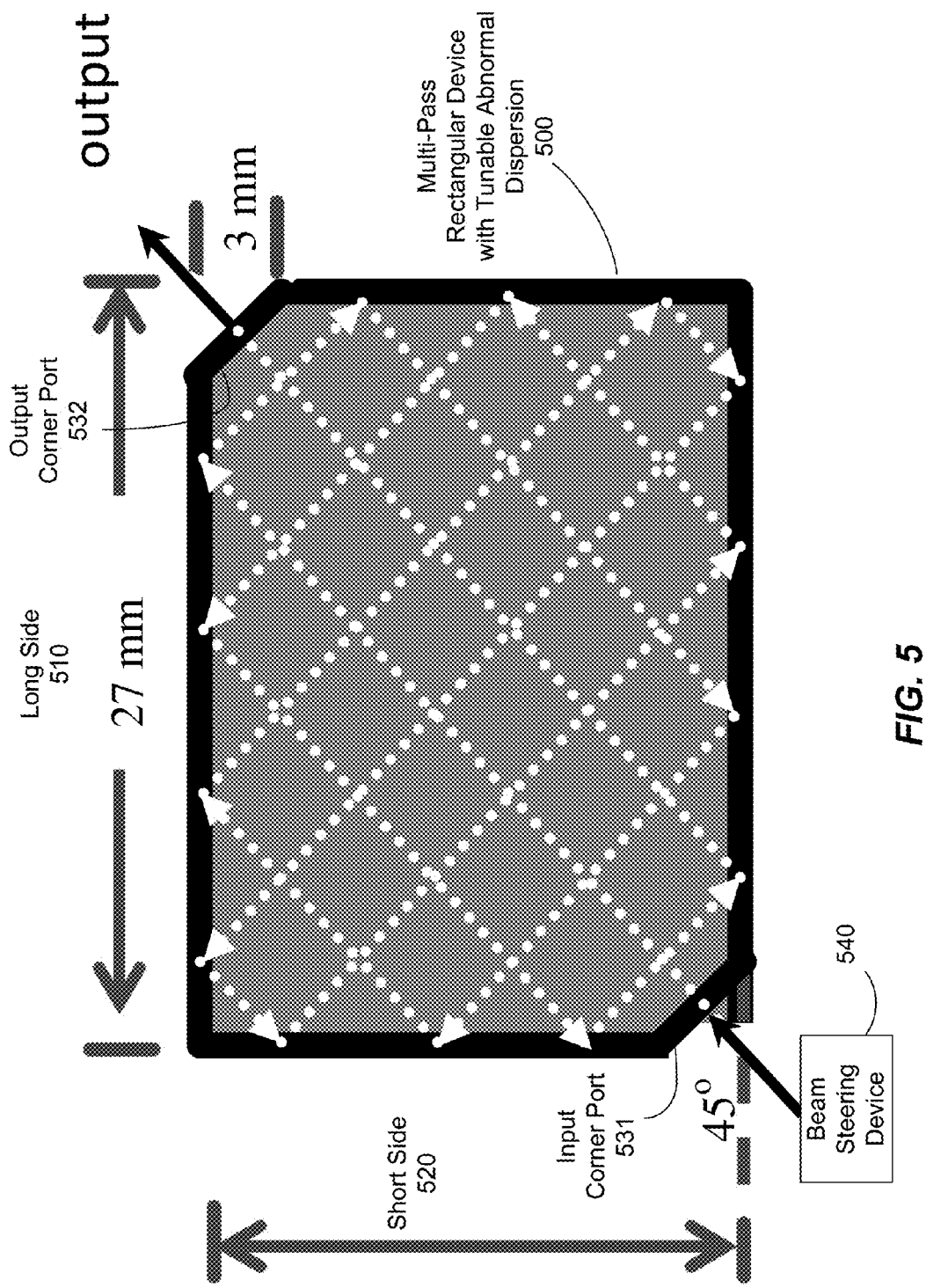
FIG. 5 shows an example of a tunable module design for dispersion compensation by the linear optical processing module in the two-stage processing where a rectangular glass material in a compact size is used to produce a long optical propagation path by folded optical paths.

FIG. 5 shows an example of such a tunable module 130 where a rectangular glass material in a compact size is used to produce a long optical propagation path by folded optical paths. The fused silica glass is a good candidate for this application due to its dispersion properties, robustness, and heat stability. The desired lengths of the fused silica glass for the two-stage processing can be as long as several tens of centimeters. This length is not desirable for a compact system. The design in FIG. 5 provides a fused silica device with a small size and dispersion tunable properties.

In FIG. 5, a rectangular fused silica glass 500 has long sides 510 and short sides 520 and is cut with 45 degree to each corner side of two opposite sides. The dimensions in FIG. 5 are examples only and can be adjusted to meet the requirements of specific applications. The input beam is launched into the device 500 perpendicular to the input cut surface 531 in this illustration. Taking advantage of total inner reflection, the beam is confined in the device via reflections at side surfaces until it hits the output cut surface 532. This multiple internal reflections effectuate a long optical propagation length in the fused silica glass material to gain the desired amount of anomalous dispersion. By tuning the incident position of the beam at the input cut surface 531, the number of times for the total reflection inside the rectangular material can be changed and this change alters the total propagation path length inside the material to change the dispersion. As an example, a 27 mm×21 mm glass can be used as shown in FIG. 5 to generate an amount of dispersion that is equivalent to a glass of the same material with a length of 300 mm.

As shown in FIG. 5, a beam steering device 540 can be provided to control or tune the incident position of the beam at the input cut surface 531 to adjust the amount of dispersion in the device in FIG. 5.

Figure 6A:
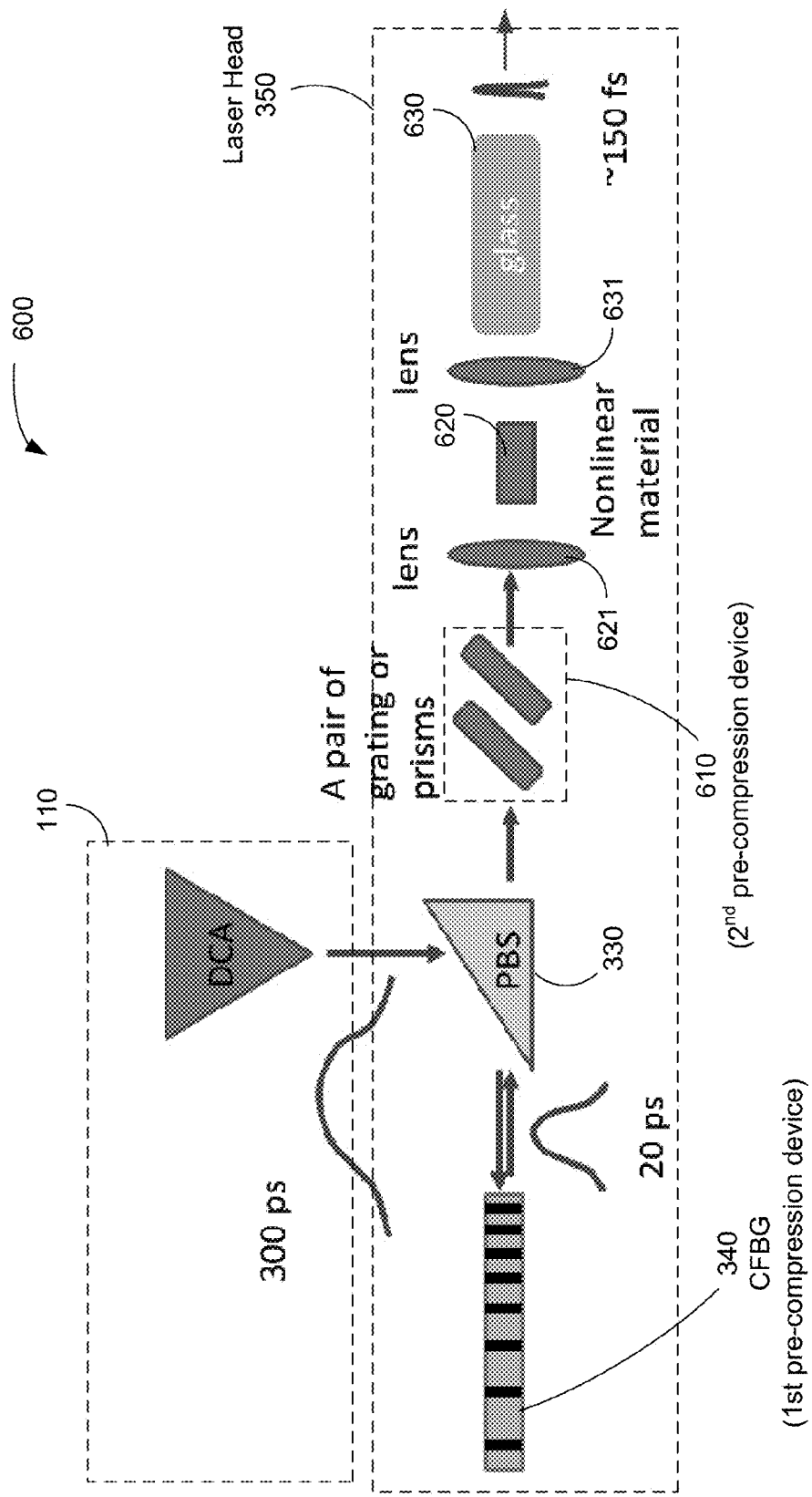
FIGS. 6A, 6B, 7 and 8 show exemplary implementations of the two-stage processing.

FIG. 6A shows another exemplary system 600 based on the two-stage processing. The initial pulse generator 110 is shown to include a DCA amplifier to produce initial laser pulses with a certain initial pulse duration (e.g., 300 ps). A PBS 330 is used to direct the initial laser pulses to a reflective CFBG 340 to pre-compress the pulse duration of the initial laser pulses to a shorter pulse duration (e.g., 20 ps). Various CFBG devices exhibit optical nonlinearities when the optical power in laser pulses is high. For example, third order harmonic generation in a CFBG is proportional to the cubic of the peak intensity. For high-peak-power pulses, the pump depletion and heat instability caused by THG in the CFGB are not negligible and are undesirable. Therefore, if a single CFBG is used to perform the entire desired pre-compression of the initial laser pulses to their transform limited pulse duration, the compressed laser pulses, with sufficient optical energy per pulse, may cause above undesired optical nonlinearities that cause pump depletion and heat instability.

The system in FIG. 3A uses a single CFBG 340 to perform the entire desired pre-compression of the initial laser pulses and thus may encounter the above undesired issues when the initial laser pulses are sufficiently powerful. In addition, the nonlinear fiber segment 120 is placed between the PBS 330 and the CFBG 340 in FIG. 3A and, as such, the self phase modulation already kicks in before the pulse is fully compressed to its transform limit shape. This configuration may adversely affect the quality of generated pulses.

The design in FIG. 6A adopts a different pre-compression design by dividing the pre-compression of the initial laser pulses to their transform limited pulse duration before the two-stage processing into two or more pre-compression stages (two pre-compression stages are shown as an example). This allows the system in FIG. 6A to obtain higher pulse power (e.g., pulse energy of greater than 100 nJ) while avoiding undesired nonlinearities occur in CFBG. The pulse is compressed in two steps to avoid undesired nonlinearity. In the first step, the pulse is compressed from the initial pulse duration (e.g., a few hundred picoseconds) to an intermediate short pulse duration (e.g., a few ten picoseconds) longer than the transform limited pulse duration by using the CFBG 340 as the first pre-compression device. Due to the long pulse width, no significant nonlinearity occurs in the first pre-compression device CFBG 340. The pulse is further compressed by a second pre-compression device 610, which, as an example, is a pair of grating or other dispersive material in FIG. 6A. The additional compression by this second pre-compression device 610 shortens the pulse duration to its transform limited pulse duration. After the second pre-compression device 610, the pulses are processed by the two-stage processing which includes, in FIG. 6A, a nonlinear material module 620 with high optical nonlinearity and a linear glass dispersive material 630. Two lenses 621 and 631 are placed in front of the nonlinear material module 620 and linear glass dispersive material 630, respectively, to control the respective optical intensities in the nonlinear material module 620 and linear glass dispersive material 630, respectively, so that the spectral broadening via SPM occurs in the nonlinear material module 620 and subsequent pulse narrowing via the dispersion compensation occurs without significant nonlinearity in the linear glass dispersive material 630. This produces the compressed, transform limited ultrashort pulses.

Figure 6B:
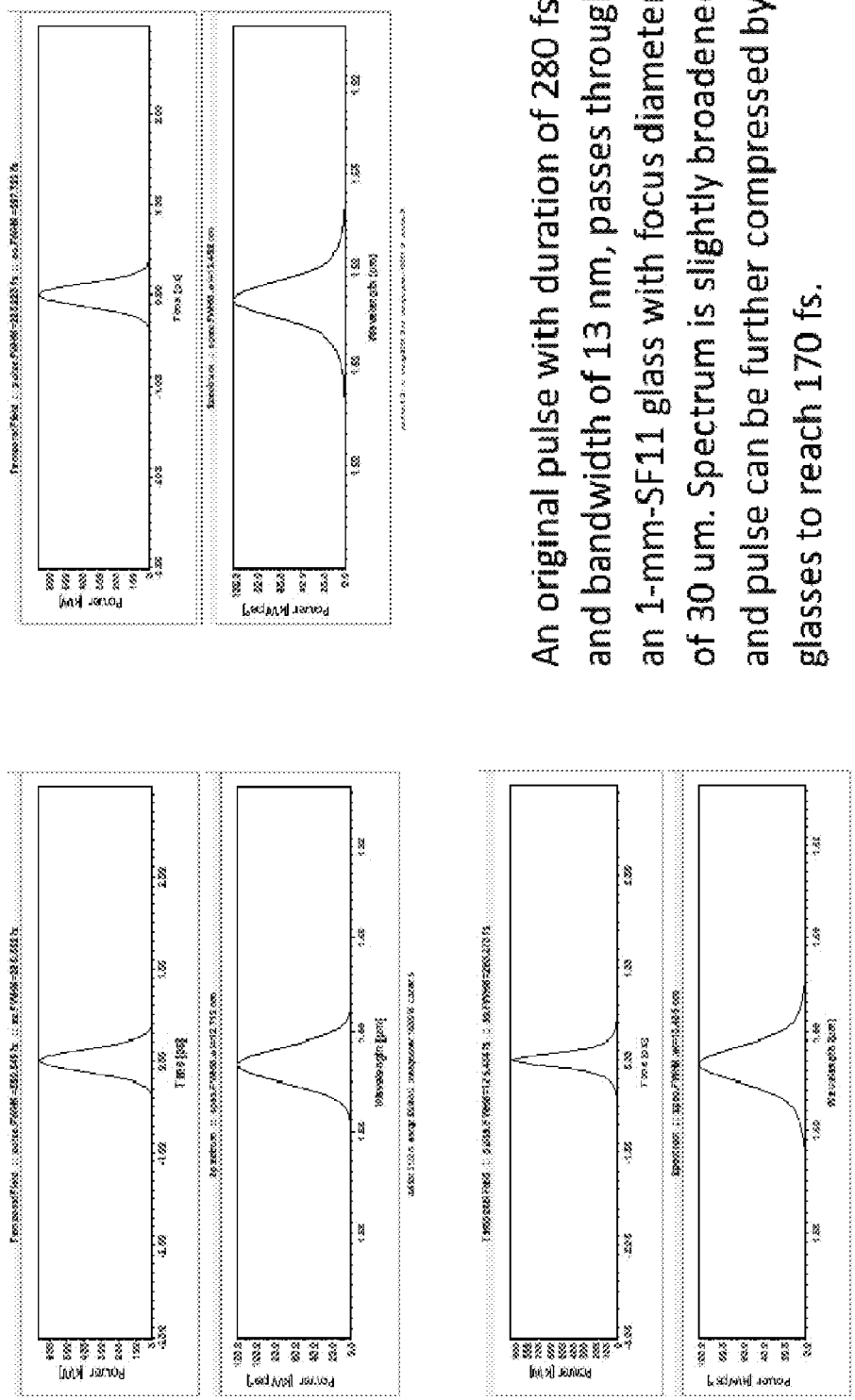

FIG. 6B shows examples of simulation results using fiber-desk for propagation of pulses with a pulse duration of 280 fs that are first focused to a highly nonlinear glass SF11 (nonlinearity is 12 times larger than fused silica) and then compressed by glasses. The nonlinearity in the glass is strong enough to broaden the spectrum within Rayleigh range and ultrashort pulse is achievable. The pulse power used in the simulation is 70 nJ. The pre-compression design in FIG. 6A based on two or more stages of pre-compression devices has a unique advantage that the higher the power the easier the ultrashort pulse can be obtained.

An alternative pre-compression design to the multi-stage pre-compression design illustrated in FIG. 6A is to use the negligible nonlinearity in a chirped volume Bragg grating (CVBG) to provide the pre-compression operation. A CVBG can be a good candidate to replace the CFBG to pre-compress high power pulse.

Figure 7:
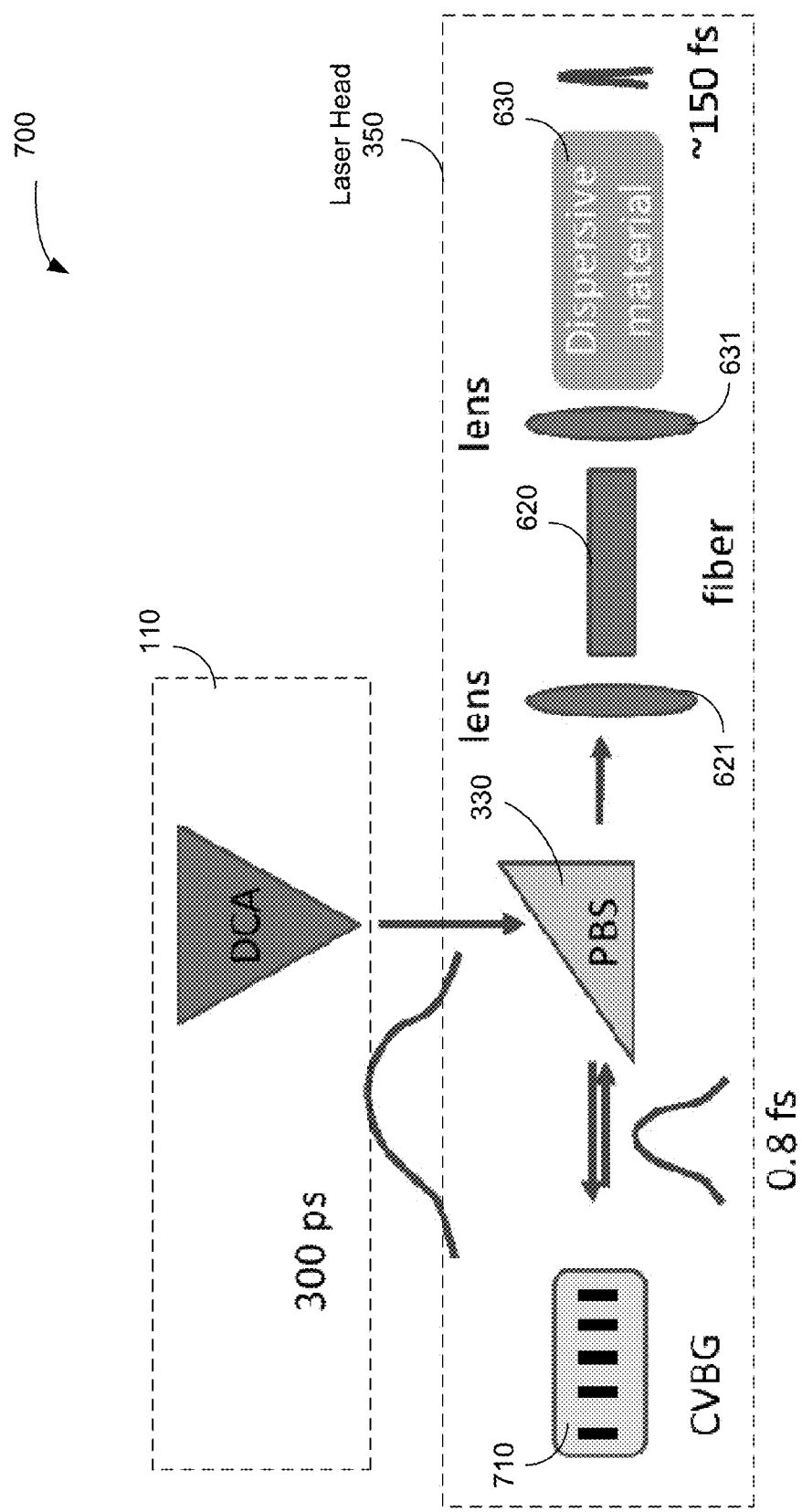

FIG. 7 shows an example of such a system. After pre-compression by CVBG 710, the laser pulses are coupled to a nonlinear fiber segment or other nonlinear optical material 620 to broaden the spectrum and use a dispersive material 630 to further compress the pulse to its transform limit shape. In some implementations, the CVBG 710 may not be able to compress the pulse to its transform limit, which may generate a pulse with a certain chirp. The nonlinearity of the nonlinear fiber or nonlinear material 620 in FIG. 7 can be used to broaden the spectrum of a slightly chirped pulse. The disadvantage of the design comes from the fact that the chirped pulse may cause pedestal to the generated output. In this case, a dispersive material can be applied between the PBS and fiber to compensate the chirp caused by CVBG 710.

In various designs described in this document, a single mode delivery fiber can be replaced by a large-mode-area (LMA) fiber or hollow-core photonic crystal fiber (HCPCF) to reduce the high nonlinearity generated by the high energy pulse. It is well known that high levels of nonlinearity will induce un-correctable pulse distortion and degrades final pulse quality. Use of the delivery fiber with a large mode area can effectively reduce the nonlinearity and maintain the pulse quality. For example, conventional SM fiber has mode field area less than 100 $um^2$ where the state of art hollow core photonics crystal fiber has mode field area larger than 1000 $um^2$ which provides factor of 10 nonlinearity reduction.

Figure 8:
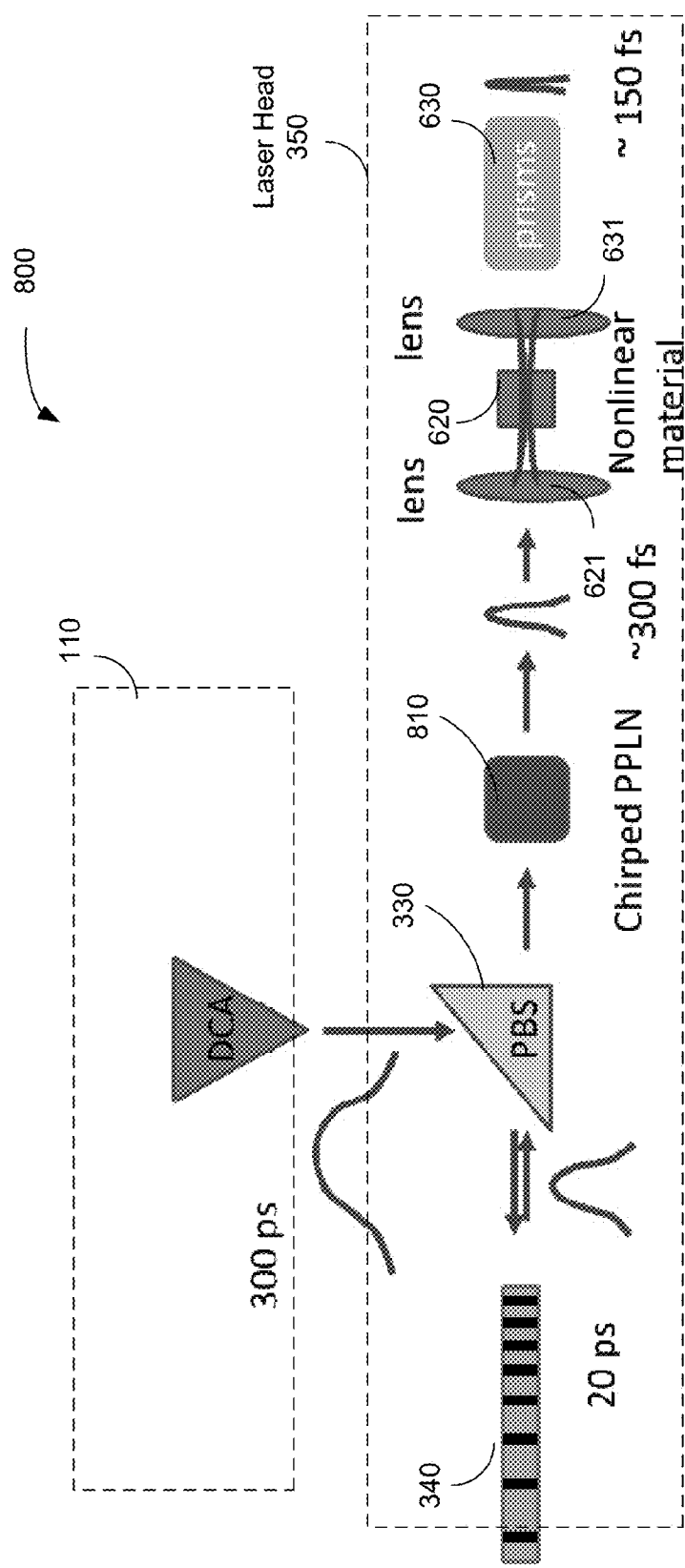

FIG. 8 shows another exemplary system 800 for generation of high power ultrashort pulses at 780 nm and other wavelengths by using a pre-compression by the CFBG 340 without reaching the transform limited pulse duration and a nonlinear compression before the two-stage processing. The CFBG 340 is configured to pre-compress each pulse to an intermediate pulse duration longer than the transform limited pulse duration to avoid undesired nonlinearities in the CFBG 340. A chirped PPLN 810 can be used to generate a transform limit pulse at 780 nm taking advantage of different group-velocities between fundamental and SHG beams. The generated pulse is focused to a highly nonlinear glass or coupled to a short fiber 620 to broaden the spectrum and is further compressed by a linear dispersive material 630 (e.g., a pair of prisms) to obtain ultrashort pulse.

Figures 9A, 9B:
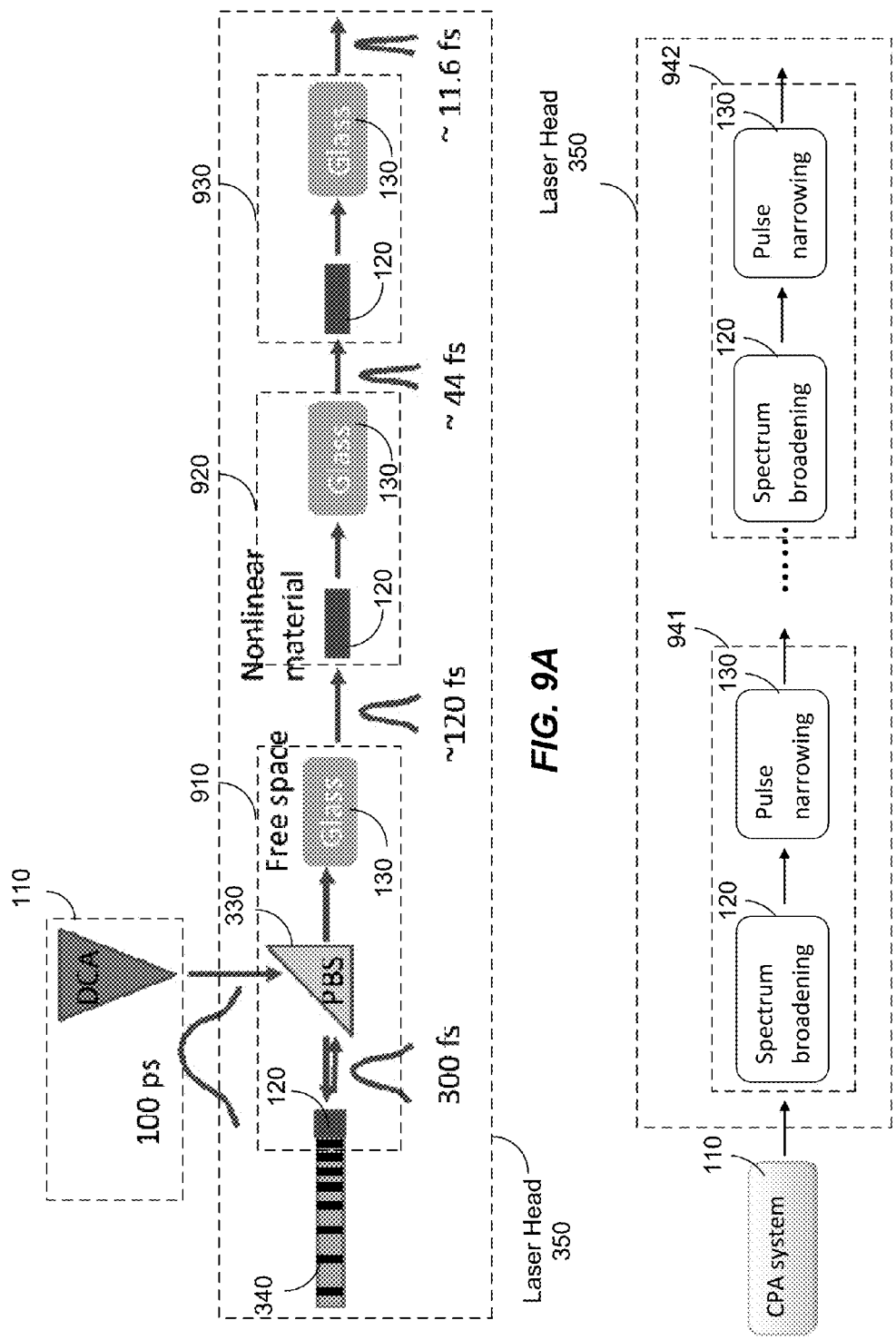
FIGS. 9A, 9B, 9C, and 10 show examples of further narrowing the pulse duration by repeating the two-stage processing so that the overall compression process is divided into two or more two-stage processing steps.

Referring back to FIG. 1A, the two-stage processing approach based on spectral broadening via SPM in the nonlinear optical processing module 120 and pulse narrowing via the anomalous dispersion in the linear optical processing module 130 may be insufficient to achieve a desired short pulse duration in some applications. One way to further narrow the pulse duration is to repeat the two-stage processing so that the overall compression process is divided into two or more two-stage processing steps. In each step, the two stages are carefully engineered to avoid or minimize the undesired pulse distortion. FIGS. 9A and 9B show two examples.

FIG. 9A shows an exemplary system that uses 3 cascaded two-stage processing modules 910, 920 and 930 to produce ultrashort laser pulses based on initial laser pulses from the module 110. Each two-stage processing module 910, 920 or 930 includes a nonlinear optical processing module 120 and a subsequent linear optical processing module 130. The initial laser pulses output by the DCA in the module 110 have an initial pulse duration (e.g., 100 ps) and are compressed to produce compressed laser pulses with a shorter pulse duration (e.g., 300 fs). After the 2-stage processing by the first module 910, the laser pulses are compressed to have a first g (CVBG) to provide the pre-compression opsecond module 910 compresses the pulse duration to be a second short pulse duration (e.g., 44 fs) and the third module 930 further compresses the pulse duration to produce the final short pulses (e.g., 11.6 fs). In each 2-stage module 910, 920 or 930, a pulse experiences SPM in a piece of polarization maintaining fiber 120 to broaden the spectrum to a certain extent and is coupled into a linear glass dispersive device 130 to compress the pulse to its transform-limited shape. The modules 910, 920 and 930 are operated under different conditions and the modules 910, 920 and 930 collectively produce desired final laser pulses with high pulse quality and desired high pulse peak power. In implementations, a downstream 2-stage module (e.g., the module 930) can have a nonlinear material module with higher optical nonlinearity than an upstream 2-stage module (e.g., the module 920). Such a cascaded system can be used to produce a pulse with duration of sub 20 fs and energy more than 50 nJ in some systems.

FIG. 9B shows another example of a more general system design for two or more cascaded two-stage processing modules 941 and 942 to produce ultrashort laser pulses based on initial laser pulses from the module 110 which is shown to be a CPA system as an example.

Figure 9C:
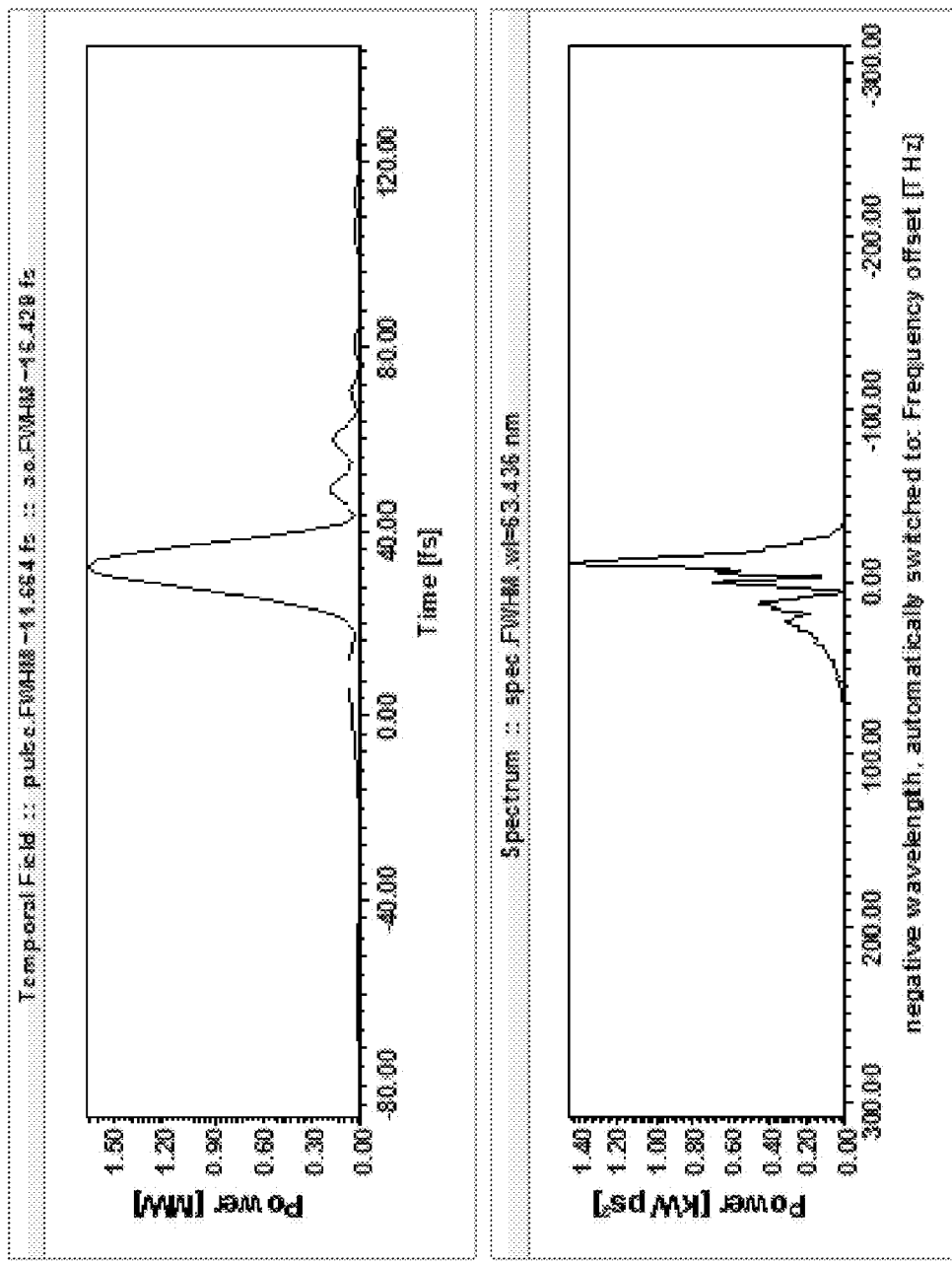

FIG. 9C shows simulation results of a cascaded system based on FIGS. 9A and 9B. The simulation shows an ultrashort pulse of 11.6 fs can be obtained. The quality factor is estimated to 70%.

Figure 10:
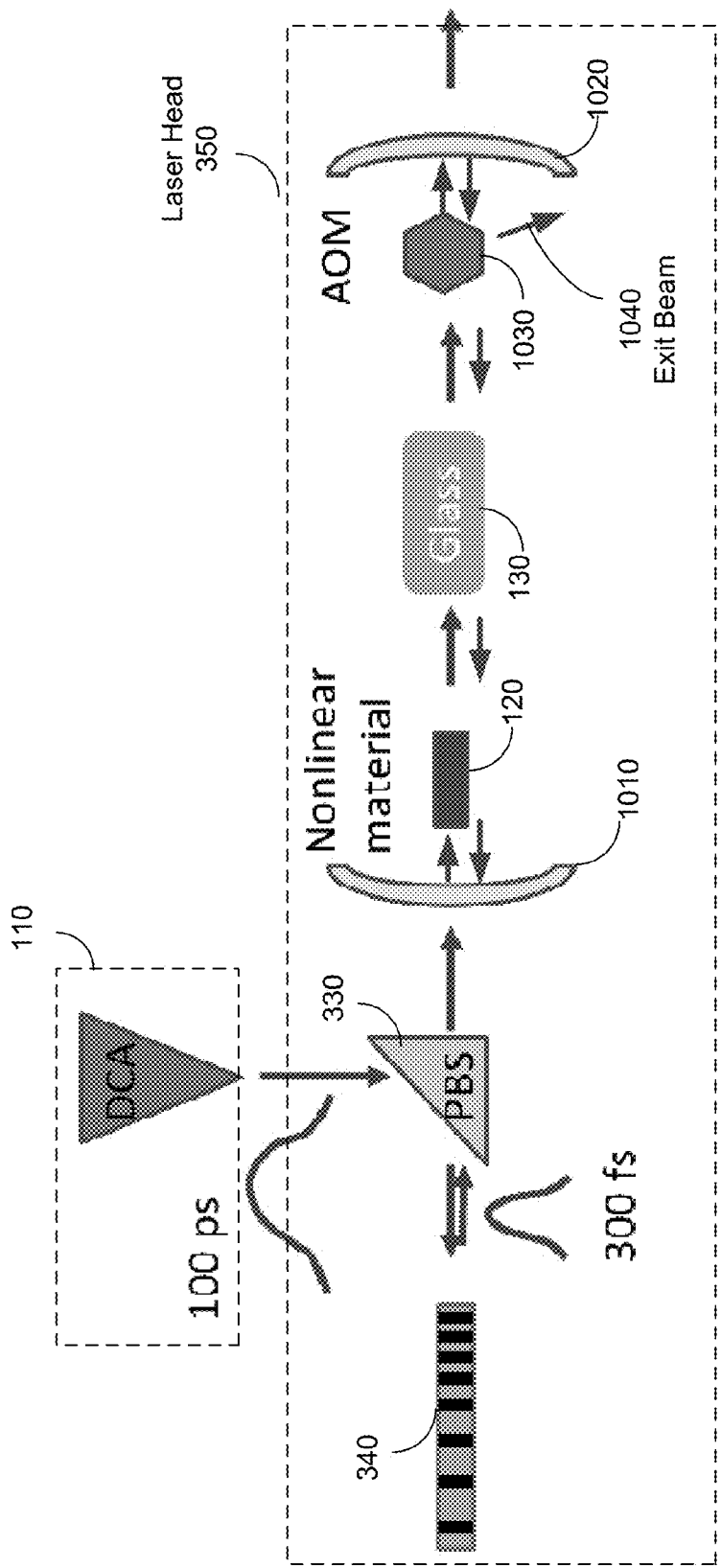

FIG. 10 shows a system where an optical cavity is used to enclose the nonlinear optical processing module 120 and the linear optical processing module 120 to allow light to bounce back and forth in the optical cavity to pass through the nonlinear optical processing module 120 and the linear optical processing module 130 multiple times to further compress the pulse duration. The optical cavity is formed by two reflectors 1010 and 1020. In this example, an acousto-optic modulator (AOM) 1030 is included in the optical cavity to control the times the laser pulses propagate in the optical cavity by controlling the timing of directing the light out of the optical cavity as the exit beam 1040.

Figure 11A:
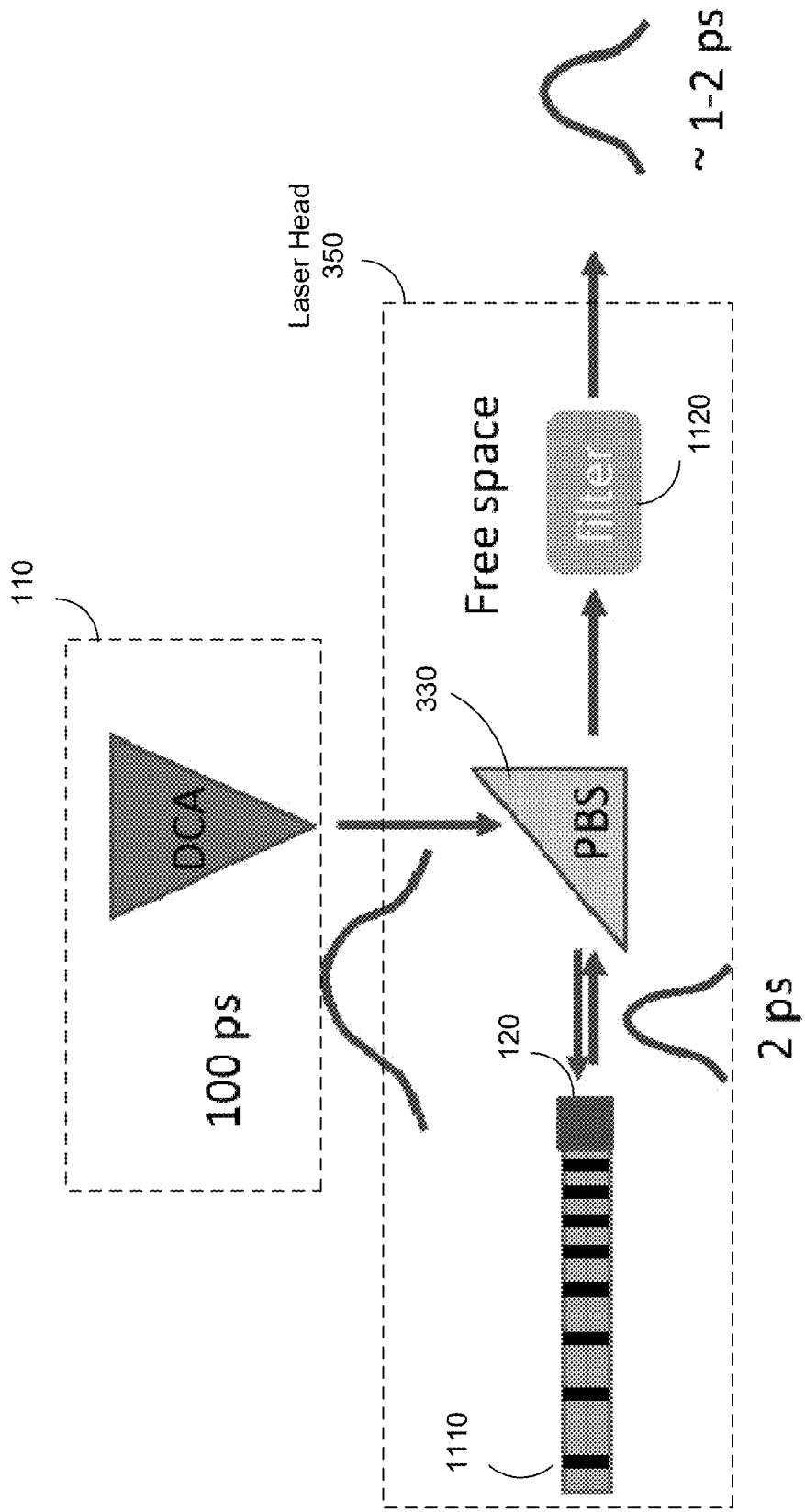
FIGS. 11A, 11B, 11C, 11D and 11E show an example of a high power a-few-picoseconds pulse laser and test results.
Figure 11B:
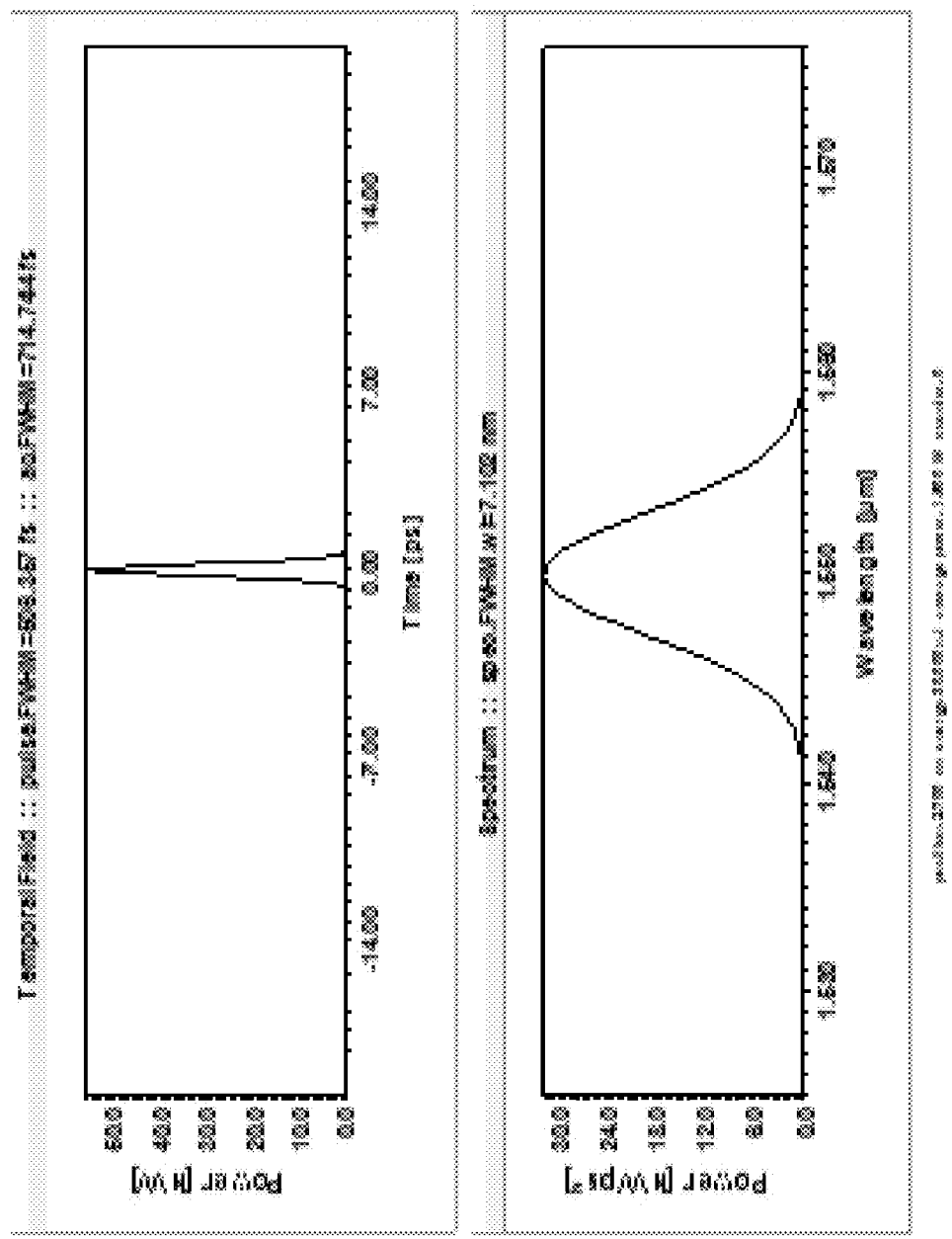
Figure 11C:
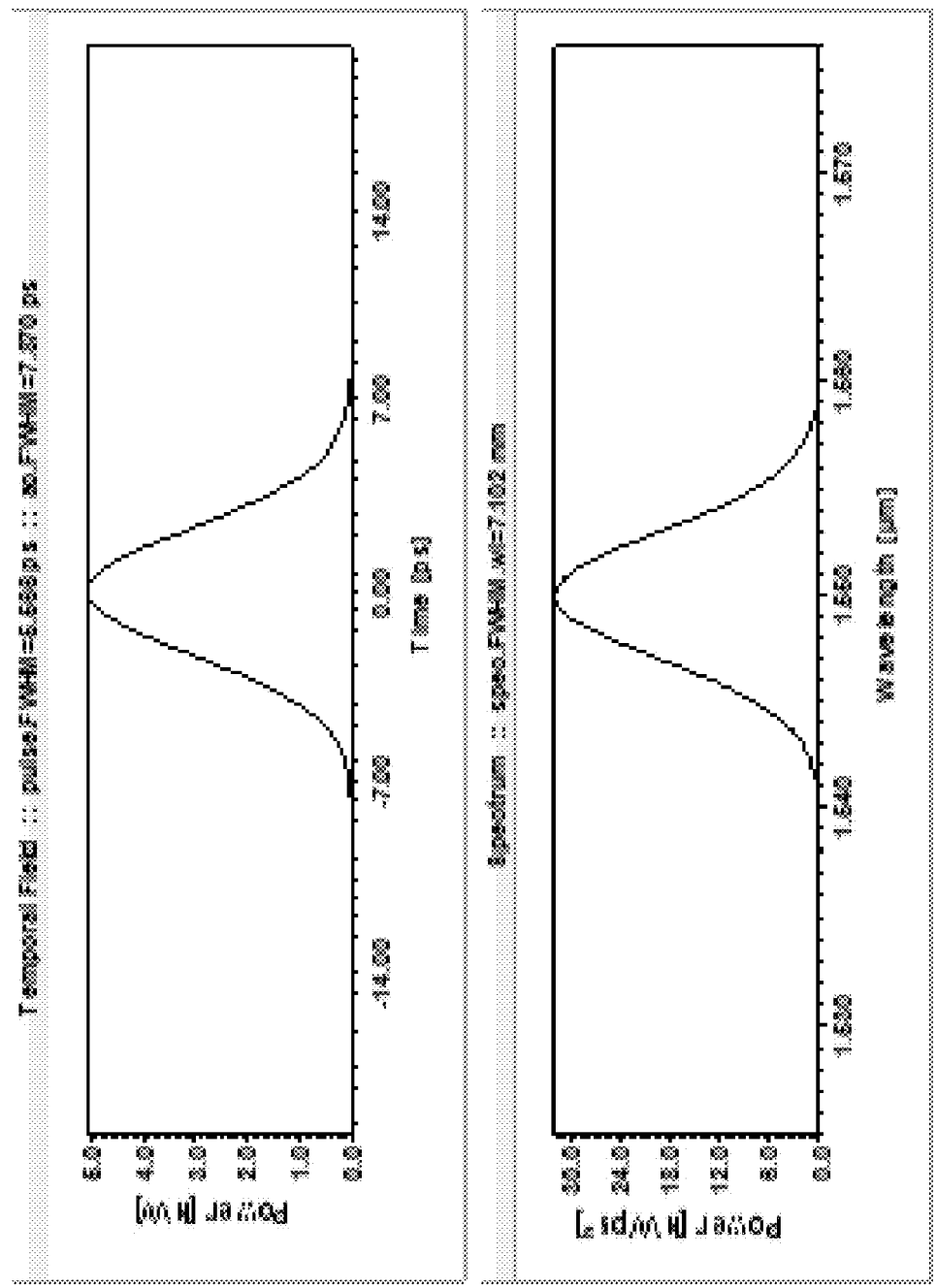
Figure 11D:
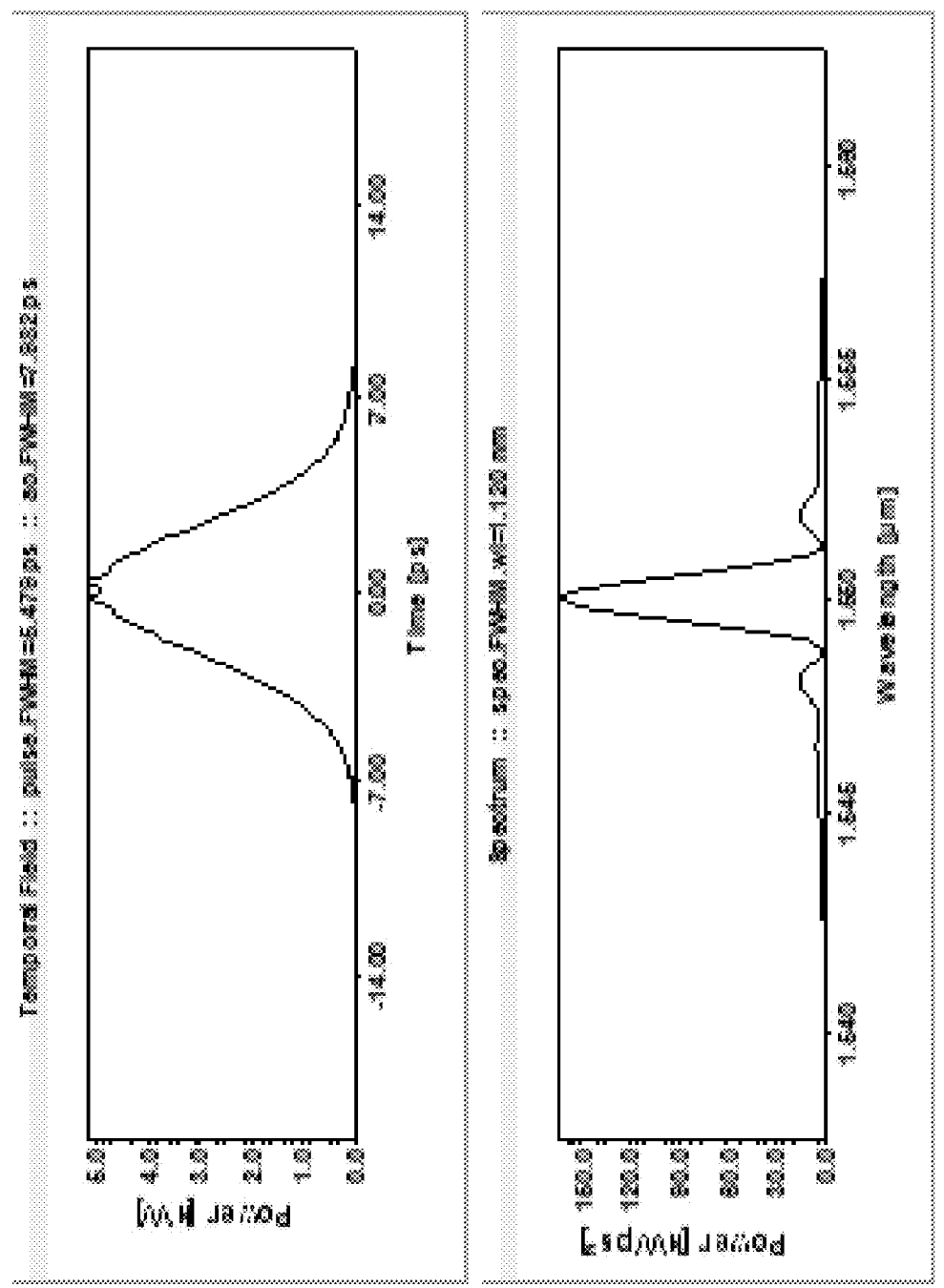
Figure 11E:
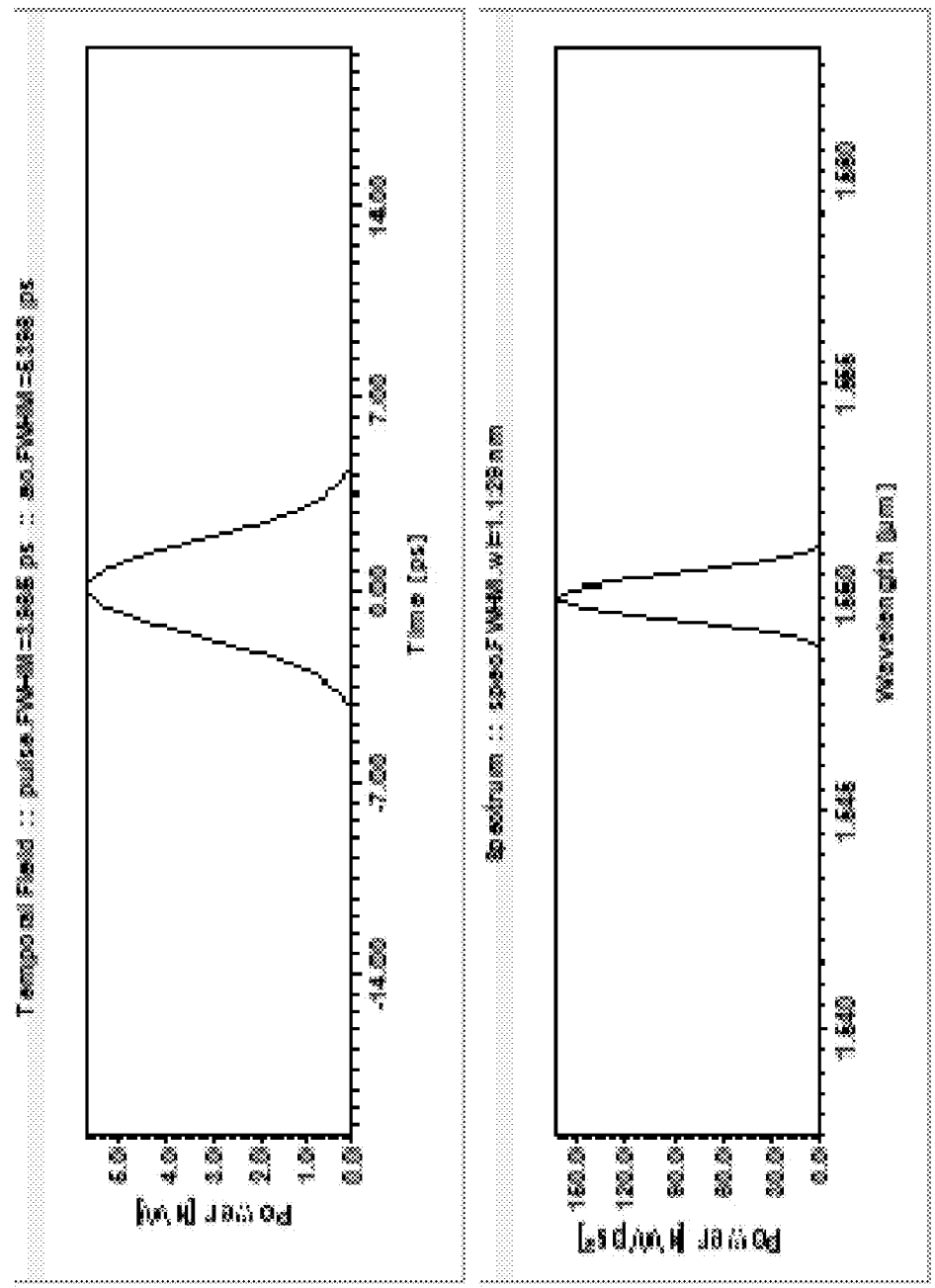

FIG. 11A shows an example of a high power a-few-picoseconds pulse laser. A broad bandwidth (e.g., more than 10 nm) is often needed for CPA to amplify pulse power. Picosecond pulse laser can be obtained by cutting the spectrum after the amplification, but this can significantly reduce the pulse power. The system in FIG. 11A can be used to generate a compact picoseconds pulse laser with high power. In this example, the reflective CFBG 1110 is configured to overcompensate the dispersion of input pulse (e.g., BW~10 nm) to obtain a negative chirped pulse as the input to the nonlinear fiber segment 120 (e.g., PM 15). The SPM in the nonlinear fiber segment 120 can narrow the spectrum of the negative chirped pulse to a bandwidth of sub-nanometer without reducing the pulse power. A transform limited picosecond pulse can be obtained after the beam passes through a spectral filter 1120. FIGS. 11B, 11C, 11D and 11E show simulation of the system in FIG. 11A where the pulse power used in the simulation is 30 nJ and several-picoseconds (e.g. 4 ps) Fourier-transform-limit pulses are generated. In the design in FIG. 11A, the SPM in the nonlinear material 120 narrows down the spectrum without reducing pulse power. The generated spectrum is a Gaussian-like spectrum and corresponds to a smooth pulse shape without side pulses.

The exemplary systems described in this document may be configured in compact packaging by using fiber components. Compact designs are partially important for some applications such as scanning two photon imaging devices where small size and moveable laser head is used. FIGS. 12A and 12B illustrate examples of compact laser head designs that include the two-stage processing within the laser head 350 which is also illustrated in the examples in FIGS. 3A, 6A, 7, 8, 9A, 10 and 11A. Referring back to FIG. 1A, the entire short pulse generation system based on the present two-stage pulse processing requires 3 main processing stages: the initial pulse generator 110 and the two modules 120 and 130 for the two-stage pulse processing. The various components for the 3 main processing stages can be strategically designed and packaged to provide a compact configuration for the laser head 350. The initial pulse generator 110 usually includes one or more pump lasers, one or more optical amplifiers (e.g., DCA), electronics and other associated components and thus tends to be bulky. As such, the packing designs in FIGS. 12A and 12B separate the bulky initial pulse generator 110 from the two modules 120 and 130 for the two-stage pulse processing. The two modules 120 and 130 and possibly some other components (e.g., components for pulse pre-compression) that are relatively small in size can be packaged into the laser head 350 as a light-weight module with a compact size and an optical cable 1201 is used to connect the bulky initial pulse generator 110 to the laser head 350 to deliver the initial laser pulses to the laser head 350 for the two-stage pulse processing. For example, the laser head 350 can have its own housing to enclose various optical components with an input optical port for receiving the output terminal port of the cable 1201 and an output optical port for outputting the final laser pulses. The laser head housing includes an input fiber connector port structured to connect to a terminal port of a fiber cable to receive initial laser pulses and an optical output port for exporting laser pulses after the two-stage processing. This overall design can be advantageously used to allow the laser head 350 to be coupled to a wide range of pulse laser sources, including many commercial pulse lasers and optical amplifiers such as fiber lasers and fiber amplifiers from Calmar Laser, a company located in Sunnyvale, Calif. and other companies. The compact-sized and light-weight laser head 350 can be engaged to a laser scanning device for easy control of the scanning of the pulsed lasers produced by the laser head 350 in laser surgical systems, material processing systems and other systems. Hence, the compact designs for the laser head 350 can be used to provide versatile and beneficial applications of the present two-stage pulse processing.

The fiber deliver cable 1201 for linking the initial laser pulse generator 110 to the laser head 350 can be implemented in various configurations such as an armor cable which includes one or more fibers inside an outer tube. The initial laser pulse generator 110 can be implemented by various laser units including CPA systems, double-clad fiber amplifiers, large mode area (LMA) fiber amplifiers and other amplifiers to provide sufficient pulse energy per pulse for further pulse processing by the two-stage pulse processing in the laser head 350. The separation of the power amplification in the initial pulse generator 110 and the compact laser head 350 allows convenient scaling up the optical energy per pulse, e.g., using ErYb doped double clad fiber to scale up the average power (e.g., a few watts in output at 1550 nm) and further increasing the pulse power by using LMA ErYb fiber amplifiers. The laser head 350 can include, the two-stage processing modules 120 and 130 and additional components, such as a nonlinear frequency conversion unit that converts the optical wavelength of the short pulses produced by the two-stage processing, a filter or other devices. For example, the pulse compression and nonlinear frequency conversion can be fully packaged into a small box laser head 350, which has, as an example, an approximate dimension of 15*9*3 cm.

The specification below provides an example of such a system based on the two-stage processing to produce sub 100 fs ultrashort laser pulses at 780 nm with output power larger than 700 mW and pulse energy more than 15 nJ. This system exhibits desirable performance including small size, high power, Gaussian-like pulse with ultra-short duration, high quality beam profile, low noise level, and long durability.

| Spec | Carmel Laser |
| --- | --- |
| Pulse duration | typical 80 fs |
| Pulse pedestal | Negligible |
| Central wavelength | 780 nm |
| Power level | >700 mW |
| Power fluctuation peak to valley (over 300 continuously running) | 2% |
| Power fluctuation (RMS) | 0.6% |
| Size | 3.0 * 9.0 * 13 cm |
| $M^2$ | <1.1 |
| Operating temperature | 17-32° C. |

Figure 12C:
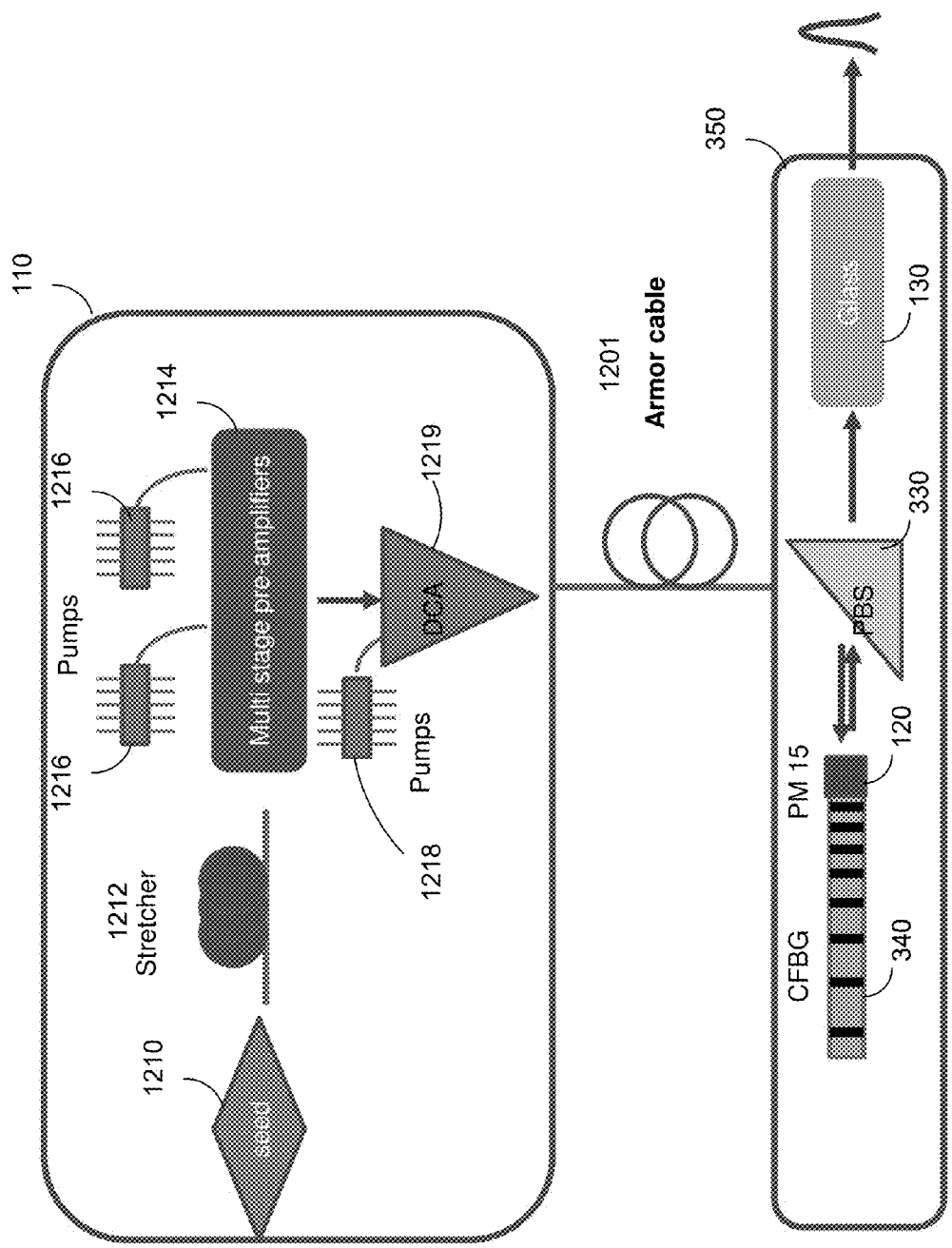
Figures 12D, 12E, 12F:
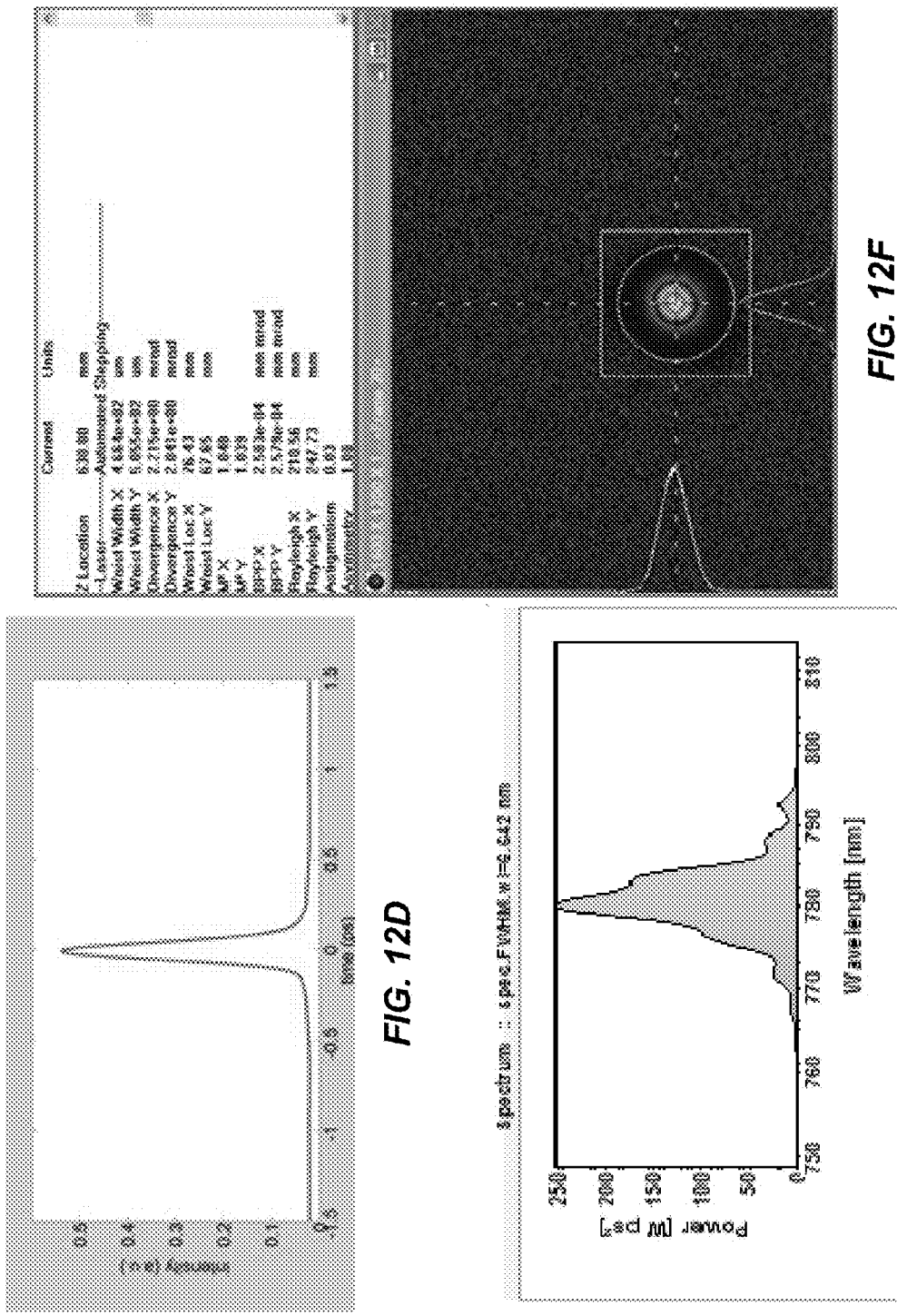

FIG. 12C shows an example of a system based on the laser head design in FIG. 12A with more details. The module 110 includes a pulsed seed laser 1210, a pulse stretcher 1212, a multi-stage amplifier module 1214 with optical amplifiers and their respective pump lasers 1216, a DCA 1219 and DCA pump lasers 1218. In this example, the module 110 includes two main amplfiiers—the first amplifier 1214 with pump lasers 1216 and the DCA amplifier 1219 pumped by one or more DCA pump lasers 1218. The double-clad fiber for the DCA 1219 can be completely enclosed within the module 110. In some implementations, the double-clad fiber for the DCA 1219 may be extended as part of the armor cable 1201 to the laser head 350 so that the DCA 1219 includes a first part of the double-clad fiber in the module 110 and a second part of the double-clad fiber in the armor cable 1201. The optical gain both parts of the double-clad fiber can provide the desired optical amplification for generation of the initial laser pulses to be processed by the laser head 350.

FIGS. 12D, 12E and 12F show an example of a test report including pulse autocorrelation, spectrum, and beam profile. An ultrashort pulse at 780 nm with duration of 70 fs is obtained. The pulse is measured to have an average power of 780 mW, pulse energy of 15 nJ, and peak power of 200 kW. In various implementations, the initial laser pulses from the module 110 can be greater than 250 fs such as 300 fs and the final output pulses produced by the laser head 350 can have short pulse durations less than 120 fs such as 100 fs.

Figure 13:
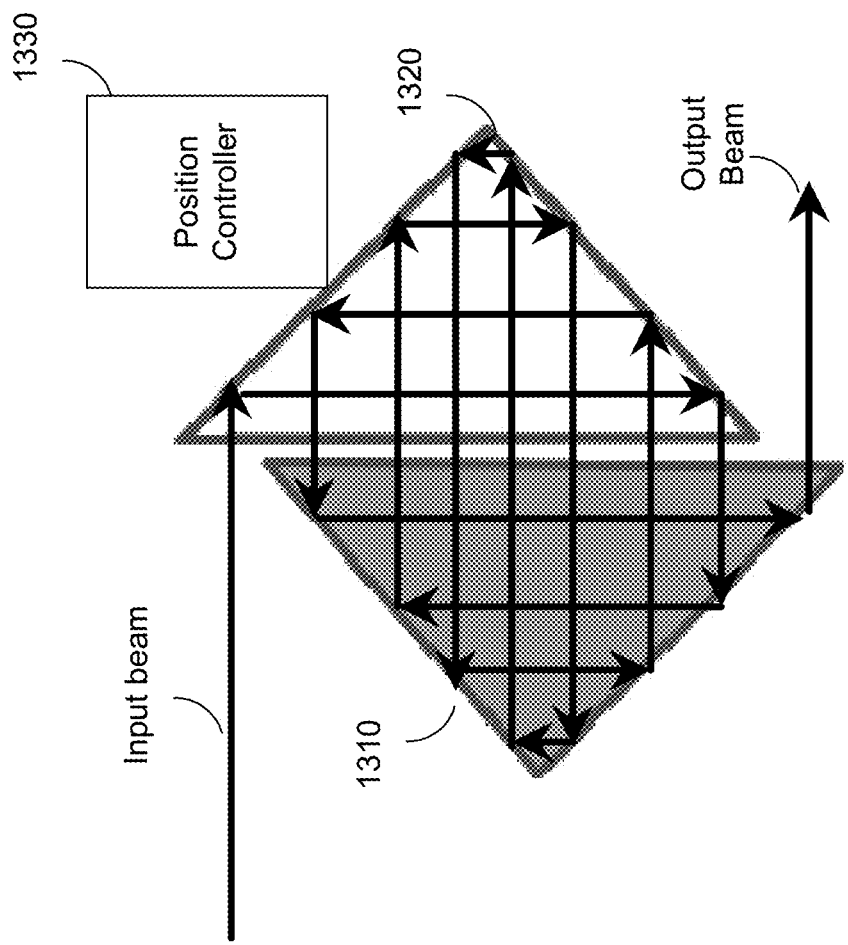
FIG. 13 shows another example of a tunable module design for dispersion compensation by the linear optical processing module in the two-stage processing based on two prisms.

FIG. 13 shows another example of a tunable module 130 for producing an adjustable dispersion for the two-stage processing described in this document. This design produces a long optical propagation path by folded optical paths between two prisms 1310 and 1320 due to the reflections at the prism surfaces. A position controller 1330 is engaged to at least one of the two prisms 1310 and 1320 to shift a relative position of the two prisms 1310 and 1320 to vary or control the total path length of the folded optical paths in the two prisms 1310 and 1320. As an example, two prisms with leg of 20 mm can be used to effectuate a dispersion of a 300-mm long path in a glass material.

Figure 14A:
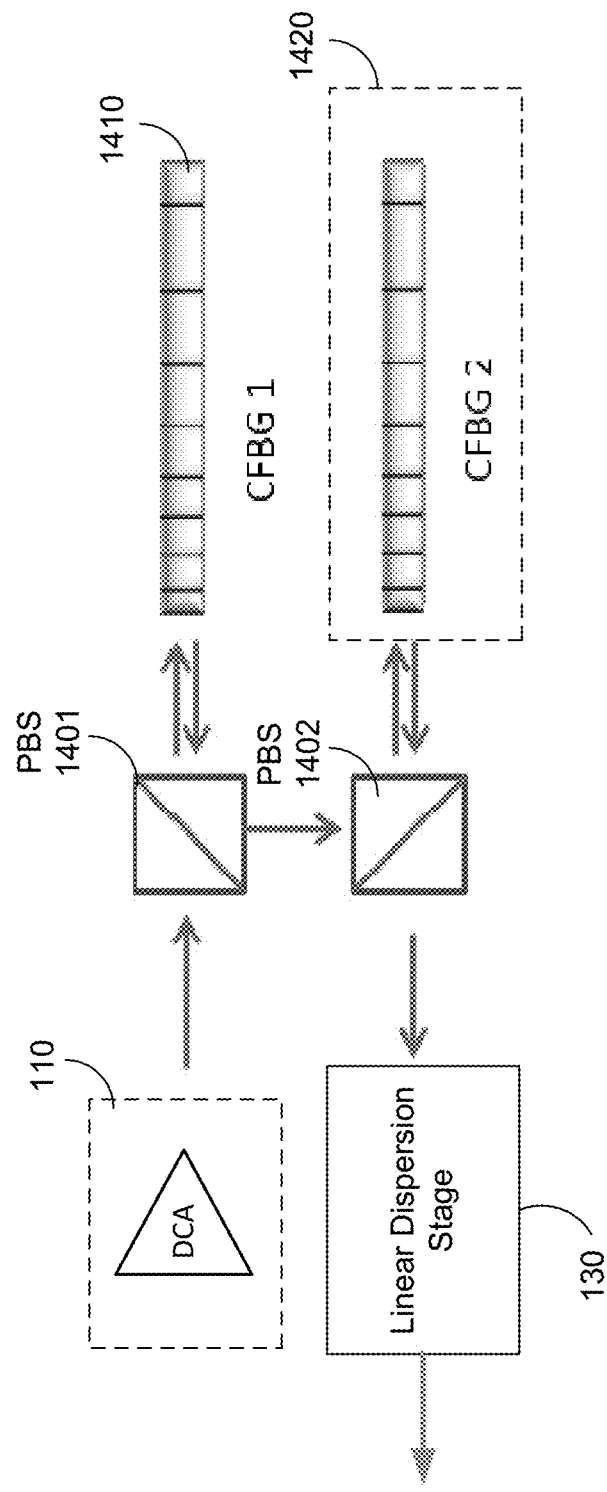
FIGS. 14A and 14B show a structure and the simulation result of an exemplary system based on a modification to the system in FIG. 6A to apply a two-stage pulse compression to generate ultrashort pulse with high pulse energy (e.g., up to 0.5 mJ per pulse in some implementations).
Figure 14B:
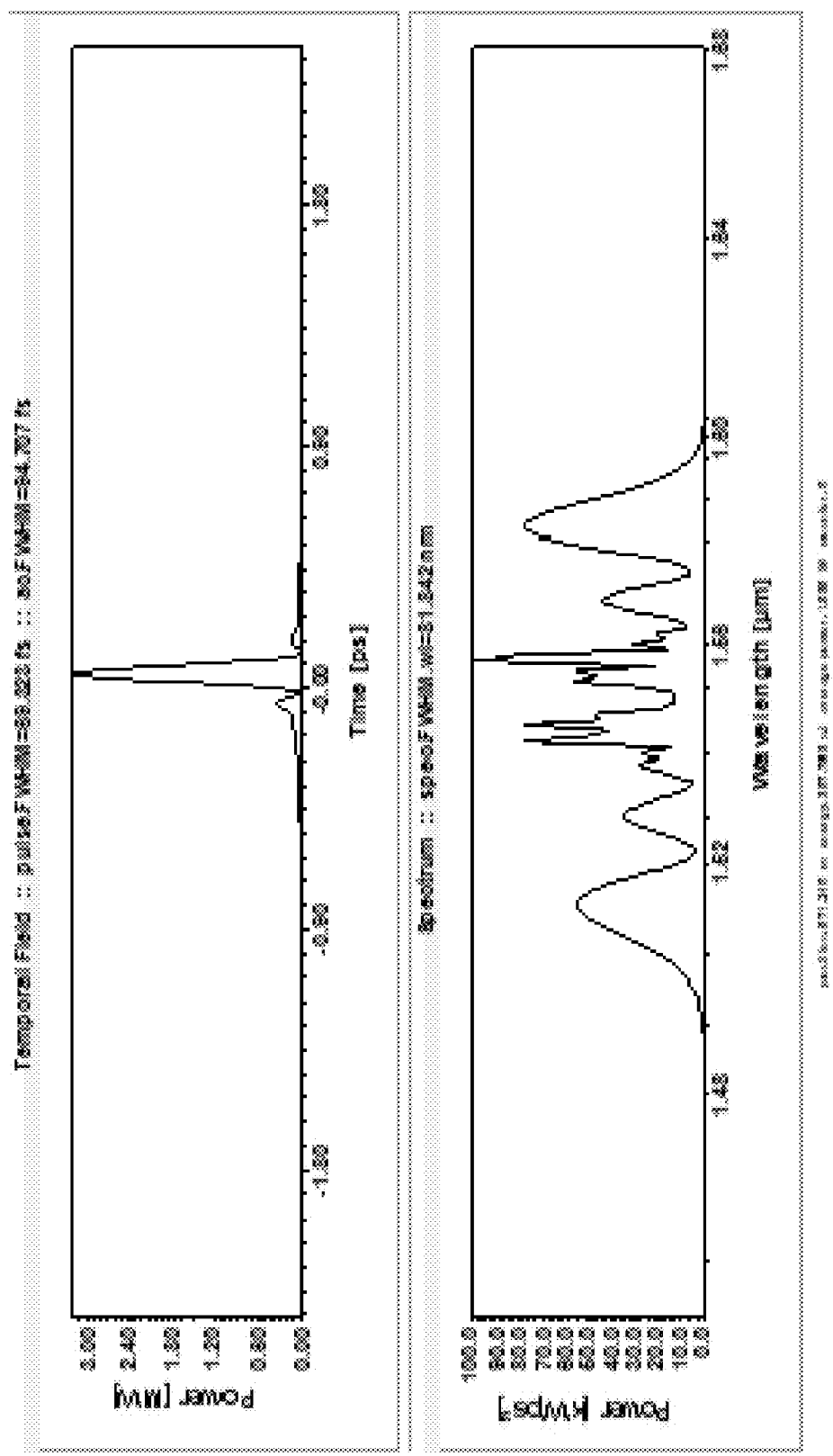

FIG. 14A shows a system based on a modification to the system in FIG. 6A to apply a two-stage pulse compression to generate ultrashort pulse with high pulse energy (e.g., up to 0.5 mJ per pulse in some implementations). To obtain pulses of higher peak power (pulse energy of greater than 100 nJ at 1550 nm for example), undesired nonlinearities start to occur in DCA and CFBG compressor. For high-peak-power pulse, the pump depletion and heat instability caused by THG are not negligible. Moreover, self phase modulation already kicks in before the pulse is fully compressed to its transform limit shape, which influences the quality of generated pulses. To reduce the high nonlinearity in DCA in the module 110, a much more stretched pulse passes through amplifiers, and therefore a CFBG compressor 1410 with higher dispersion is used to compensate the chirp of incident pulse. To reduce the early SPM, the CFBG compressor 1410 needs a shorter grating length. To reduce the THG, the spectral bandwidth of incident pulse is limited to be a few nanometers. The conditions are conflict with each other if only one CFBG 1410 is used to compress the pulse. FIG. 14A uses two CFBG 1410 and 1420 to compress the laser pulses. The CFBG 1410 has a longer grating length and a higher dispersion value to provide the majority of the desired pulse compression for the chirp. The CFBG 1420 has a shorter grating length and a low dispersion and is used to finally compress the pulse and broaden the spectrum. A subsequent linear optical processing module 130 is coupled to receive and further compress the output pulses from the two CFBG devices 1410 and 1420. Using this method, up to 0.5 mJ 100 fs pulse can be achieved. FIG. 14B shows the simulation which shows most of the harmful nonlinearities in DCA, CFBG, etc.

Figure 15A:
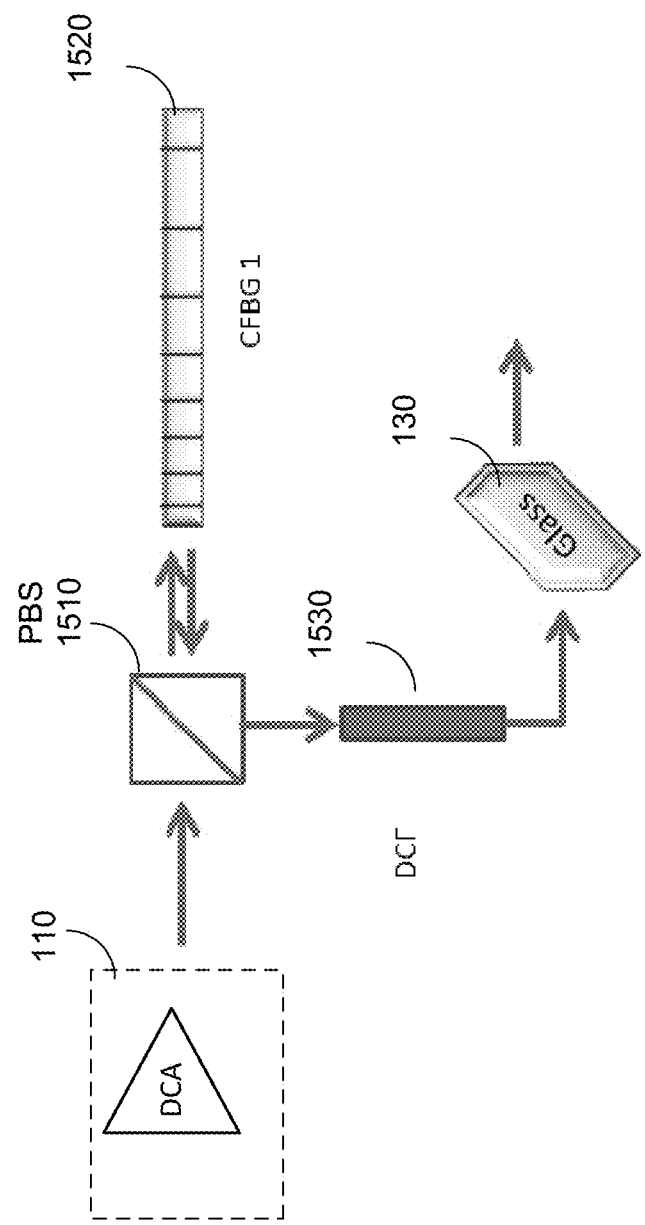
FIGS. 15A and 15B shows the structure and simulation results of an exemplary short pulse generation system that uses a different two-stage processing based on an initial stage with normal dispersion.
Figure 15B:
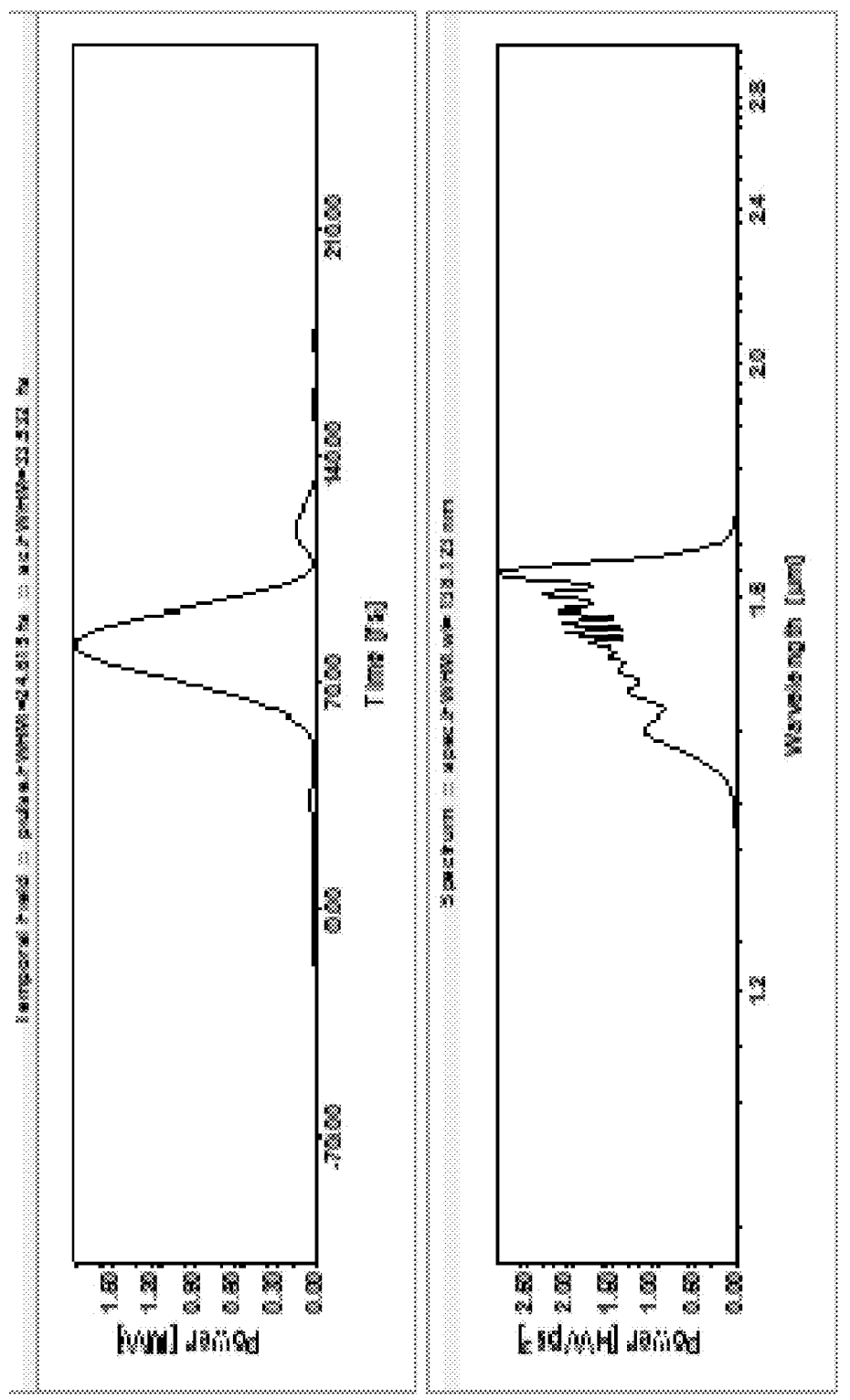

FIG. 15A shows a short pulse generation system that uses a different two-stage processing than the two-stage processing described in the above examples. As shown, the initial laser pulses are directed by the PBS 1510 into a reflective CFBG 1520 which pre-compress the pulses. The PBS 1510 directs the pre-compressed pulses from the reflective CFBG 1520 into a first fiber segment 1530 with normal dispersion and then to a linear optical processing unit 130 with anomalous dispersion. For example, a dispersion compensation fiber (DCF) with normal dispersion can be used as the first fiber segment 1530. This design takes advantages of pulse getting parabolic spectrum broadening in fibers with normal dispersion. Large pedestal or even solution splitting can occur when pulse experiences SPM and dispersion together in an anomalous dispersion fiber, which limits the pulse duration through a single pass. However, in normal dispersion region, the pulse will experience SPM with quasi-parabolic spectrum broadening, which enables the pulse to reach ultra short pulse without pulse splitting. With this method, a pulse with duration less than 25 fs can be obtained and 91% energy is confined in the main pulse. After SHG, a sub 20 fs laser at 780 nm can be achieved. FIG. 15B shows simulation of the pulse generation in FIG. 15A. An ultrashort pulse with duration less than 25 fs can be achieved. The quality factor is more than 90%. The use of a normal dispersion material disclosed here can be implemented using various configurations described in this document, including cascading two or more two-stage processing and using an optical cavity to include a two-stage processing unit as described above.

Figure 16:
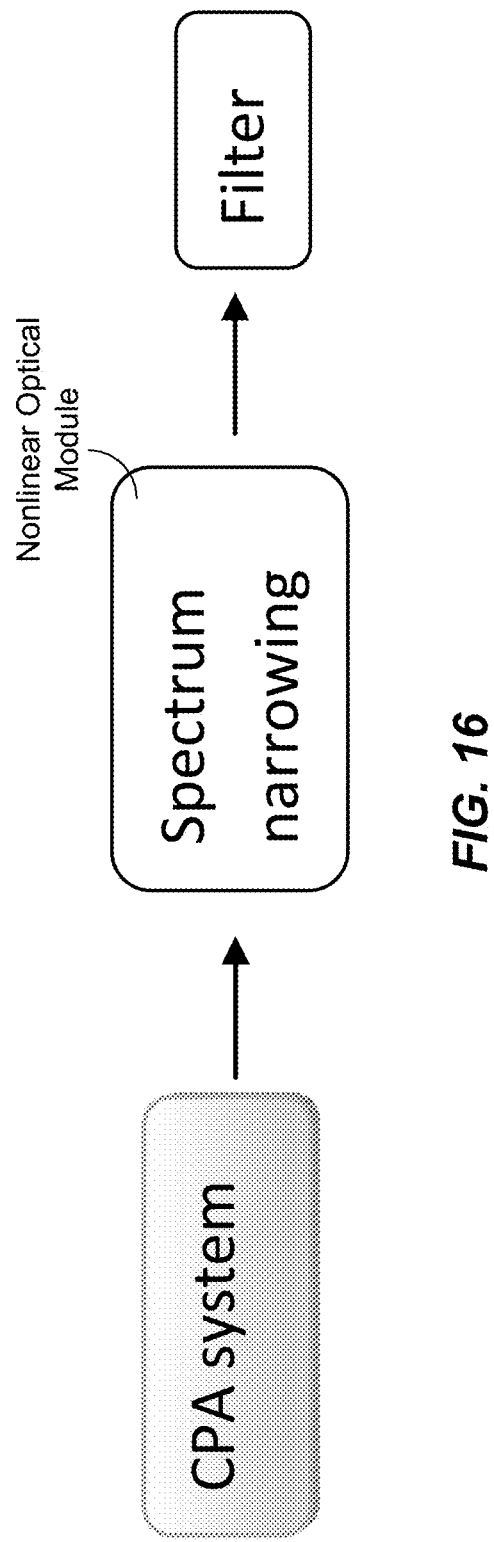
FIG. 16 shows yet another example of a short pulse generation system where a pre-compression device in CPA system over-compensates the dispersion of input pulse to obtain a negative chirped pulse.

FIG. 16 shows yet another example of a short pulse generation system where a pre-compression device in CPA system over-compensates the dispersion of input pulse to obtain a negative chirped pulse. SPM in nonlinear material will narrow the spectrum of the negative chirped pulse to a bandwidth of sub-nanometer without reducing the pulse power. A transform limited picosecond pulse can be obtained after the beam passes through a spectral filter.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for generating ultrashort laser pulses by separating a nonlinear processing of laser pulses via nonlinear self-phase modulation (SPM) in a nonlinear optical medium from a subsequent linear processing of the laser pulses to achieve ultrashort laser pulses, comprising:

directing input laser pulses into a nonlinear optical processing module to have an optical intensity that reaches at or above an intensity threshold for SPM in the nonlinear optical processing module to cause spectral broadening of, and an amount of frequency chirp in, each of the laser pulses due to the nonlinear SPM;

controlling an intensity of spectrally broadened laser pulses output from the nonlinear optical processing module to be below a nonlinear intensity threshold level for nonlinear SPM in a linear optical processing module with anomalous dispersion that is optically coupled to receive the spectrally broadened and pre-compressed laser pulses output from the nonlinear optical processing module without causing optical nonlinearity or the nonlinear SPM;

configuring a length of optical propagation of the linear optical processing module to cause an amount of anomalous optical dispersion in the spectrally broadened laser pulses that compensates for the frequency chirp produced by the nonlinear optical processing module and causes compression of a pulse width in time to produce output laser pulses that are spectrally broadened, and are compressed in the pulse duration in time with respect to a spectral width and a pulse duration of the input laser pulses;

operating a seed laser to generate seed laser pulses;

stretching a pulse duration of the seed laser pulses to produce stretched seed laser pulses;

amplifying optical power of the stretched seed laser pulses;

compressing a pulse duration of the amplified stretched seed laser pulses to produce the input laser pulses which are further processed by the nonlinear optical processing module and the linear optical processing module to produce the output laser pulses;

using a reflective chirped fiber Bragg grating to receive and reflect the amplified stretched seed laser pulses to compress the pulse duration in generating the input laser pulses; and suppressing heat generated by a third-order harmonic generation in the reflective chirped fiber Bragg grating.

2. The method as in claim 1, comprising:

using a transparent coating outside the reflective chirped fiber Bragg grating that is transparent to light of the third-order harmonic generation to direct the light of the third-order harmonic generation through the transparent coating to exit the reflective chirped fiber Bragg grating without causing heating in the reflective chirped fiber Bragg grating.

3. The method as in claim 1, comprising:

using a low index coating outside the reflective chirped fiber Bragg grating to confine the light of the third-order harmonic generation in the low index coating to avoid trapping the light of the third-order harmonic generation inside the reflective chirped fiber Bragg grating.

* * * * *